United States Patent
Cui et al.

(10) Patent No.: US 11,836,220 B2
(45) Date of Patent: *Dec. 5, 2023

(54) UPDATING OF STATISTICAL SETS FOR DECENTRALIZED DISTRIBUTED TRAINING OF A MACHINE LEARNING MODEL

(71) Applicant: International Business Machines Corporation, Armonk, NY (US)

(72) Inventors: Xiaodong Cui, Chappaqua, NY (US); Wei Zhang, Elmsford, NY (US); Mingrui Liu, College Station, TX (US); Abdullah Kayi, Elmsford, NY (US); Youssef Mroueh, New York, NY (US); Alper Buyuktosunoglu, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/176,765

(22) Filed: Mar. 1, 2023

(65) Prior Publication Data

US 2023/0205843 A1 Jun. 29, 2023

Related U.S. Application Data

(63) Continuation of application No. 17/159,710, filed on Jan. 27, 2021, now Pat. No. 11,636,280.

(51) Int. Cl.
*G06F 18/214* (2023.01)
*G06F 15/173* (2006.01)
(Continued)

(52) U.S. Cl.
CPC ...... *G06F 18/214* (2023.01); *G06F 15/17375* (2013.01); *G06F 18/285* (2023.01); *G06N 3/08* (2013.01); *G06N 20/00* (2019.01)

(58) Field of Classification Search
CPC ............... G06K 9/6256; G06K 9/6227; G06F 15/17375; G06N 3/08; G06N 20/00
See application file for complete search history.

(56) References Cited

U.S. PATENT DOCUMENTS

| | | | |
|---|---|---|---|
| 6,889,236 B2 * | 5/2005 | Hars | G06F 7/58 708/250 |
| 6,980,926 B1 * | 12/2005 | O'Brien, Jr. | G06F 18/00 702/179 |

(Continued)

OTHER PUBLICATIONS

Non-Final Office Action received for U.S. Appl. No. 17/159,710 dated Sep. 13, 2022, 27 pages.

(Continued)

*Primary Examiner* — Lewis G West
(74) *Attorney, Agent, or Firm* — Amin, Turocy & Watson, LLP

(57) ABSTRACT

Systems, computer-implemented methods, and computer program products to facilitate updating, such as averaging and/or training, of one or more statistical sets are provided. According to an embodiment, a system can comprise a memory that stores computer executable components and a processor that executes the computer executable components stored in the memory. The computer executable components can include a computing component that averages a statistical set, provided by the system, with an additional statistical set, that is compatible with the statistical set, to compute an averaged statistical set, where the additional statistical set is obtained from a selected additional system of a plurality of additional systems. The computer executable components also can include a selecting component that (Continued)

selects the selected additional system according to a randomization pattern.

20 Claims, 10 Drawing Sheets

(51) Int. Cl.
*G06N 20/00* (2019.01)
*G06N 3/08* (2023.01)
*G06F 18/20* (2023.01)

(56) References Cited

U.S. PATENT DOCUMENTS

| | | | | |
|---|---|---|---|---|
| 7,103,502 | B1* | 9/2006 | O'Brien, Jr. | G01S 7/5273 708/200 |
| 7,302,419 | B2* | 11/2007 | Conkwright | G06Q 30/02 705/14.69 |
| 8,533,194 | B1* | 9/2013 | Ravid | G06N 20/10 707/736 |
| 8,693,288 | B1* | 4/2014 | O'Brien, Jr. | G06F 17/18 367/135 |
| 10,284,585 | B1* | 5/2019 | Kennedy | H04L 63/1425 |
| 11,228,379 | B1* | 1/2022 | O'Shea | H04B 17/11 |
| 11,636,280 | B2* | 4/2023 | Cui | G06N 20/00 382/159 |
| 2003/0187889 | A1* | 10/2003 | Hars | G06F 17/18 708/250 |
| 2003/0236761 | A1* | 12/2003 | Fiske | G06F 18/28 706/46 |
| 2004/0220842 | A1* | 11/2004 | Barney | G06Q 10/10 705/310 |
| 2004/0236559 | A1* | 11/2004 | Chen | G06F 30/33 703/18 |
| 2005/0209785 | A1* | 9/2005 | Wells | G16B 40/30 702/19 |
| 2005/0250098 | A1* | 11/2005 | Toivonen | G16B 20/00 702/20 |
| 2007/0208516 | A1* | 9/2007 | Kutsyy | G06F 18/214 702/19 |
| 2009/0006383 | A1* | 1/2009 | Tunkelang | G06F 16/3331 707/999.005 |
| 2009/0249018 | A1* | 10/2009 | Nojima | G06F 3/0631 711/170 |
| 2010/0042561 | A1* | 2/2010 | Abe | G06N 20/20 706/12 |
| 2010/0076969 | A1* | 3/2010 | Sampas | G16B 40/00 707/E17.046 |
| 2012/0317058 | A1* | 12/2012 | Abhulimen | G06N 20/00 706/2 |
| 2014/0195165 | A1* | 7/2014 | Kim | G16B 5/00 702/19 |
| 2015/0218646 | A1* | 8/2015 | Haince | C12Q 1/6886 506/17 |
| 2016/0026917 | A1* | 1/2016 | Weisberg | G06N 7/01 706/46 |
| 2016/0062735 | A1* | 3/2016 | Wilber | G06F 40/35 708/250 |
| 2017/0076143 | A1* | 3/2017 | Sapiro | G06F 18/24323 |
| 2017/0329873 | A1* | 11/2017 | Eide | G06F 21/6254 |
| 2017/0329880 | A1* | 11/2017 | Ghosh | G06F 5/01 |
| 2018/0039902 | A1* | 2/2018 | Jeffries | G06N 7/01 |
| 2018/0066317 | A1* | 3/2018 | Pfister | G16B 20/00 |
| 2019/0107545 | A1* | 4/2019 | Chancellor | G01N 33/6869 |
| 2019/0392264 | A1* | 12/2019 | Wang | G06V 10/764 |
| 2020/0097810 | A1* | 3/2020 | Hetherington | G06N 20/20 |
| 2020/0175370 | A1 | 6/2020 | Zhang et al. | |
| 2020/0193332 | A1* | 6/2020 | Zhang | G06N 20/20 |
| 2020/0311597 | A1* | 10/2020 | Beauchamp | G06N 20/20 |
| 2020/0342310 | A1* | 10/2020 | Farchi | G06N 20/10 |
| 2021/0097472 | A1* | 4/2021 | Inamdar | G06F 16/24578 |
| 2021/0150140 | A1* | 5/2021 | Galitsky | G06F 40/30 |
| 2021/0178697 | A1* | 6/2021 | Nilakantan | B29C 64/386 |
| 2021/0272003 | A1* | 9/2021 | Rigetti | G06F 9/544 |
| 2021/0357766 | A1* | 11/2021 | Paul | G06N 5/02 |
| 2021/0374547 | A1* | 12/2021 | Wang | G06N 3/047 |
| 2022/0051038 | A1* | 2/2022 | Coimbra De Andrade | G06T 7/10 |
| 2022/0192578 | A1* | 6/2022 | Doidge | G16H 50/20 |
| 2022/0392583 | A1* | 12/2022 | Godin | G06N 3/088 |

OTHER PUBLICATIONS

Kamp et al., "Efficient Decentralized Deep Learning by Dynamic Model Averaging," arXiv:1807.03210v2 [cs.LG] Nov. 13, 2018, 31 pages.

Luo et al., "Heterogeneity-Aware Asynchronous Decentralized Training," arXiv:1909.08029v1 [cs.DC] Sep. 17, 2019, 13 pages.

Luo et al., "Prague: High-Performance Heterogeneity-Aware Asynchronous Decentralized Training," ASPLOS '20: Proceedings of the Twenty-Fifth International Conference on Architectural Support for Programming Languages and Operating Systems, Mar. 2020, 16 pages.

Zhang et al., "Improving Efficiency in Large-Scale Decentralized Distributed Training," 45th International Conference on Acoustics, Speech, and Signal Processing (ICASSP'2020) Oral, Feb. 2020, 5 pages.

Mell et al., "The NIST Definition of Cloud Computing," Recommendations of the National Institute of Standards and Technology, NIST Special Publication 800-145, Sep. 2011, 7 pages.

Notice of Allowance received for U.S. Appl. No. 17/159,710 dated Dec. 21, 2022, 44 pages.

Zhou et al., "Communication-efficient Decentralized Machine Learning over Heterogeneous Networks," arXiv:2009.05766v1 [cs.DC] Sep. 12, 2020, 17 pages.

* cited by examiner

UPDATING OF STATISTICAL SETS FOR DECENTRALIZED DISTRIBUTED TRAINING OF A MACHINE LEARNING MODEL

BACKGROUND

One or more embodiments herein relate generally to updating of statistical sets for improvement of decentralized distributed training of a machine learning model, and more specifically, to updating, such as averaging and/or training, of one or more statistical sets being non-centrally located relative to one another to train a machine learning model.

SUMMARY

The following presents a summary to provide a basic understanding of one or more embodiments described herein. This summary is not intended to identify key or critical elements, or to delineate any scope of the particular embodiments or any scope of the claims. The sole purpose of the summary is to present concepts in a simplified form as a prelude to the more detailed description that is presented later. In one or more embodiments described herein, devices, systems, computer-implemented methods, apparatus and/or computer program products are described that can facilitate the updating, such as training, of one or more statistical sets.

According to an embodiment, a system can comprise a memory that stores computer executable components and a processor that executes the computer executable components stored in the memory. The computer executable components can include a computing component that averages a statistical set with an additional statistical set that is compatible with the statistical set to thereby compute an averaged statistical set, where the additional statistical set is selected from a plurality of additional statistical sets. The computer executable components also can include a selecting component that selects the additional statistical set according to a randomization pattern.

According to another embodiment, a computer-implemented method can comprise averaging, by a system operatively coupled to a processor, a statistical set with an additional statistical set that is compatible with the statistical set to thereby compute an averaged statistical set, where the additional statistical set is selected from a plurality of additional statistical sets. The computer-implemented method also can comprise selecting, by the system, the additional statistical set according to a randomization pattern.

According to yet another embodiment, a computer program product facilitating a process to compute an averaged statistical set, can comprise a computer readable storage medium having program instructions embodied therewith. The program instructions can be executable, by the processor, to cause the processor to average, by the processor, a statistical set with an additional statistical set that is compatible with the statistical set to thereby compute an averaged statistical set, where the additional statistical set is selected from a plurality of additional statistical sets. The program instructions also can be executable, by the processor, to cause the processor to select, by the processor, the additional statistical set according to a randomization pattern.

DETAILED DESCRIPTION

Figure 1:
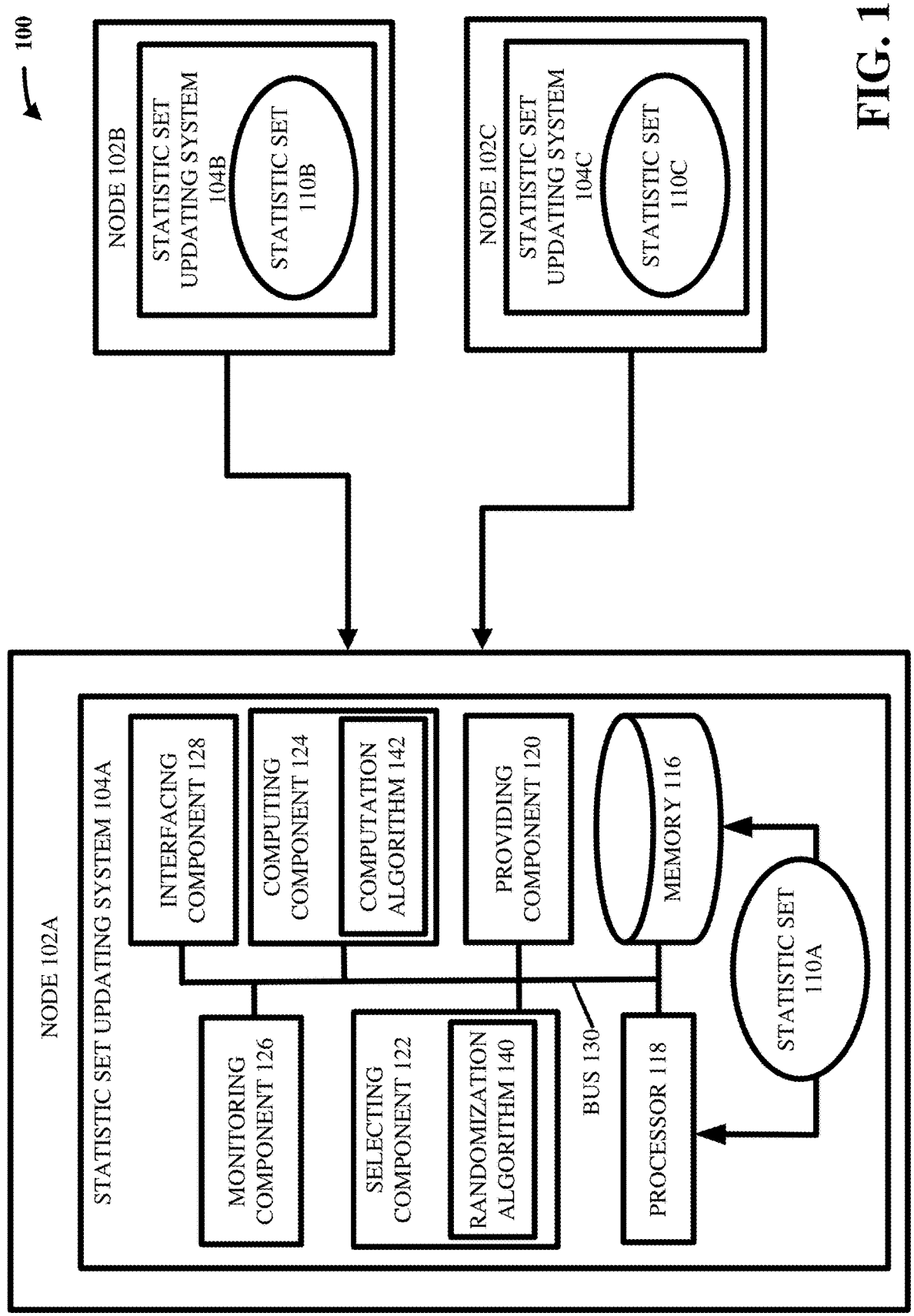
FIG. 1 illustrates a block diagram of an example, non-limiting system that can facilitate updating, such as averaging and/or training, of a plurality of statistical sets, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in this Detailed Description section.

With reference to use of large statistical sets, it will be appreciated that related use continues to become more commonplace both domestically and commercially in various industries. As used herein, a statistical set can include one or more statistics, such as realized from data including, but not limited to raw data and/or transformed data, textual data, structured data, unstructured data, image and/or audio data, programming data, training data, data provided in a numerical language, data concerning one or more qualities for an optimization technique and/or the like. A statistical set can include, but is not limited to, a machine learning (ML) model, gradient, optimized and/or transformed data, parameter and/or similar. For example, an ML model or a gradient can be a realization of one or more statistics. For example, large-scale distributed training can play a role in deep learning to allow for dealing with large amounts of training data and models or other statistics with deep architectures. In one example, statistical sets, such as including ML models, can be constructed related to medical history, financial backgrounds, purchase history, item availability and/or the like. Such ML models can be utilized for a variety of determinations such as insurance liability, chance of mortgage or other financial default, medical diagnoses, speech recognition, text recognition, computer vision and/or the like. In many cases, multiple versions and/or portions of a parent statistical set can exist across various machines, which machines can be provided at a plurality of nodes that can be locally and/or non-centrally distributed. One or more of the versions and/or portions can be different from one another. For example, non-centrally located versions can be modified differently than one another.

An efficient distributed training system can aim at maximizing the convergence rate to consensus of respective statistical sets while minimizing the communication cost afforded by the computing nodes. However, updating, including averaging and/or training, of two or more of the versions and/or portions can be a memory-intensive and/or time-intensive process. Convergence rate to consensus of the statistical set(s) being updated can be limited by the speed and/or processing power of any one node, in addition to by ability of any one node to communicate with other nodes within a respective system comprising the respective statistical sets. This can be the case with respect to each node individually and with respect to the system comprising the nodes.

At least partially addressing these problems, decentralized distributed updating, such as averaging and/or training, can be a strategy used when dealing with large scale statistics, such as comprised by large scale training statistical sets or other statistical sets. Decentralized distributed updating utilizes various servers associated with various nodes participating in the decentralized distributed updating. This type of updating, different than centralized updating using a single parameter server, can remove the communication bottleneck associated with a single parameter server, in that a parameter server is not used. However, when there are a large number of nodes (also herein referred to as learners) each comprising or accessing a statistical set to be employed in the respective statistical set updating operation, even decentralized distributed updating can encounter unwanted communication cost such as slower communication affecting performance of the overall updating process. Partial model averaging can be used to reduce this communication cost, where each node is directed to communicate only with a selection of nodes being less than a whole of the plurality of nodes participating in the respective updating process. However, even using a fixed distributed model, communication cost can be unwantedly high, resulting in a convergence to consensus among the nodes taking an unwanted or unavailable amount of time, and thus capitalizing on processing power and/or memory that could be used for other unrelated, such as queued, processes.

Given these problems, one or more embodiments described herein can be implemented to produce a solution to one or more of these problems in the form of systems, computer-implemented methods, and/or computer program products that can facilitate the following processes: a) computing, including averaging and/or training, of a plurality of, e.g., two or more, statistical sets; b) providing iterations of averaged statistical sets; c) communicating among nodes of a system according to a randomization pattern; d) selecting communicating subsets of the nodes according to the randomization pattern; and/or e) interfacing with an entity to provide a status regarding the computations and/or regarding convergence rate to consensus of the statistical set(s) being updated. That is, embodiments described herein include one or more systems, computer-implemented methods, apparatuses and/or computer program products that can facilitate one or more of the aforementioned processes. The one or more systems, computer-implemented methods and/or computer program products can automatically update one or more statistical sets without constituent feedback in a reduced time and/or using fewer updating iterations at one or more, such as each, system involved, as compared to available updating methods. This can result in an increased convergence rate to consensus among the statistical sets being updated, as compared to available updating methods. The reduced time of updating can therefore allow for freeing up of memory and/or processing power at the plurality of nodes performing the updating. The one or more systems, computer-implemented methods and/or computer program products can provide the aforementioned updating even where one or more nodes performing the updating are decentralized relative to one another.

Further, with respect to the statistical set being updated, the reduced updating time can be in the range of reduction from weeks to days or from days to hours, for example with particular respect to training of ML models. Additionally, the randomized statistical set updating provided by the embodiments described herein can introduce noise in the updating, which noise can aid the one or more systems, computer-implemented methods and/or computer program products to find a more robust local optimum in a respective optimization landscape, as compared to available updating methods, such as those utilizing fixed statistical set updating. For example, an AI model being trained by an embodiment of the statistical set updating system can have better generalization, therefore reducing a degree of overfitting. This improvement can be successively reflected in improved classification accuracy, such as in the speech recognition domain, as compared to use of fixed statistical set updating.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident in various cases, however, that the one or more embodiments can be practiced without these specific details.

Turning now in particular to one or more figures, and first to FIG. 1, the figure illustrates a block diagram of an example, non-limiting system 100 that facilitates updating, such as averaging and/or training, of one or more statistical sets in accordance with one or more embodiments described herein. The system 100 can comprise a statistical set updating system 104A, which can be associated with a cloud computing environment. The statistical set updating system 104A can be comprised by a node 102A, which node can include one or more machines comprised by the statistical set updating system 104A. As used herein, the one or more machines can include one or more of a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone and/or another type of device.

In some examples, the system 100 can comprise a plurality of such nodes, e.g., nodes 102A, 102B, 102C, etc., and thus a plurality of statistical set updating systems 104A, 104B, 104C, etc. In another example, the statistical set updating system 104A can be associated with a cloud computing environment 950 described below with reference to FIG. 9 and/or with one or more functional abstraction layers described below with reference to FIG. 10 (e.g., hardware and software layer 1060, virtualization layer 1070, management layer 1080 and/or workloads layer 1090). In the previous example, the nodes 102A, 102B and 102C can communicate with one another via a cloud computing environment, such as the cloud computing environment 950.

Statistical set updating system 104A and/or components thereof (e.g., providing component 120, selecting component 122, computing component 124, monitoring component 126 and/or interfacing component 128) can employ one or more computing resources of the cloud computing environment 950 described below with reference to FIG. 9, and/or with reference to the one or more functional abstraction layers (e.g., quantum software and/or the like) described below with reference to FIG. 10, to execute one or more operations in accordance with one or more embodiments described herein. For example, cloud computing environment 950 and/or one or more of the functional abstraction layers 1060, 1070, 1080 and/or 1090 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by statistical set updating system 104A and/or components thereof to execute one or more operations in accordance with one or more embodiments described herein. For instance, statistical set updating system 104A and/or components thereof can employ one or more classical and/or quantum computing resources to execute one or more classical and/or quantum: mathematical functions, calculations and/or equations; computing and/or processing scripts; algorithms; models (e.g., artificial intelligence (AI) models, machine learning (ML) models and/or like model); and/or another operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model can include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models are as Follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy and/or compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing among clouds).

A cloud computing environment is service oriented with a focus on statelessness, low coupling, modularity and/or semantic interoperability. At the heart of cloud computing is an infrastructure that includes a network of interconnected nodes.

Moreover, the system 100 can be associated with or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system or the like. In accordance therewith, system 100 can be employed to use hardware and/or software to solve problems that are highly technical in nature, that are not abstract and/or that cannot be performed as a set of mental acts by a human.

Turning now to aspects of statistical set updating system 104A, it can comprise a memory 116, a processor 118, providing component 120, selecting component 122, computing component 124, monitoring component 126 and/or interfacing component 128.

It should be appreciated that the embodiments depicted in various figures disclosed herein are for illustration only, and as such, the architecture of embodiments is not limited to the systems, devices and/or components depicted therein, nor to any particular order, connection and/or coupling of systems, devices and/or components depicted therein. For example, in some embodiments, system 100 and/or statistical set updating system 104A can further comprise various computer and/or computing-based elements described herein with reference to operating environment 800 and FIG. 8. In several embodiments, computer and/or computing-based elements can be used in connection with implementing one or more of the systems, devices, components and/or computer-implemented operations shown and described in connection with FIG. 1 or with other figures disclosed herein.

Memory 116 can store one or more computer and/or machine readable, writable and/or executable components and/or instructions that, when executed by processor 118 (e.g., a classical processor, a quantum processor and/or like processor), can facilitate performance of operations defined by the executable component(s) and/or instruction(s). For example, memory 116 can store computer and/or machine readable, writable and/or executable components and/or instructions that, when executed by processor 118, can facilitate execution of the various functions described herein relating to statistical set updating system 104A, providing component 120, selecting component 122, computing component 124, monitoring component 126, interfacing component 128 and/or another component associated with statistical set updating system 104A as described herein with or without reference to the various figures of the one or more embodiments.

Memory 116 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures. Further examples of memory 116 are described below with reference to system memory 806 and FIG. 8. These examples of memory 116 can be employed to implement any one or more embodiments described herein.

Processor 118 can comprise one or more types of processors and/or electronic circuitry (e.g., a classical processor, a quantum processor and/or like processor) that can implement one or more computer and/or machine readable, writable and/or executable components and/or instructions that can be stored at memory 116. For example, processor 118 can perform various operations that can be specified by computer and/or machine readable, writable and/or executable components and/or instructions including, but not limited to, logic, control, input/output (I/O), arithmetic and/or the like. In some embodiments, processor 118 can comprise one or more central processing unit, multi-core processor, microprocessor, dual microprocessors, microcontroller, System on a Chip (SOC), array processor, vector processor, quantum processor and/or another type of processor. Additional examples of processor 118 are described below with reference to processing unit 804 and FIG. 8. The examples of processor 118 can be employed to implement any one or more embodiments described herein.

Statistical set updating system 104A, memory 116, processor 118, providing component 120, selecting component 122, computing component 124, monitoring component 126, interfacing component 128 and/or another component of statistical set updating system 104A as described herein can be communicatively, electrically, operatively and/or optically coupled to one another via a bus 130 to perform functions of system 100, statistical set updating system 104A and/or any components coupled therewith. Bus 130 can comprise one or more memory bus, memory controller, peripheral bus, external bus, local bus, a quantum bus and/or another type of bus that can employ various bus architectures. Further examples of bus 130 are described below with reference to system bus 808 and FIG. 8. The examples of bus 130 can be employed to implement any one or more embodiments described herein.

Statistical set updating system 104A can comprise any type of component, machine, device, facility, apparatus and/or instrument that comprises a processor and/or can be capable of effective and/or operative communication with a wired and/or wireless network. All such embodiments are envisioned. For example, statistical set updating system 104A can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players and/or another type of device.

Statistical set updating system 104A can be coupled (e.g., communicatively, electrically, operatively, optically and/or the like) to one or more external systems, sources and/or devices (e.g., classical and/or quantum computing devices, communication devices and/or the like) via a data cable (e.g., High-Definition Multimedia Interface (HDMI), recommended standard (RS) 232, Ethernet cable and/or the like). In some embodiments, statistical set updating system 104A can be coupled (e.g., communicatively, electrically, operatively, optically and/or the like) to one or more external systems, sources and/or devices (e.g., classical and/or quantum computing devices, communication devices and/or the like) via a network, such as statistical set updating systems 104B and 104C, being decentralized relative to one another and relative to statistical set updating system 104A.

In some embodiments, a network can comprise one or more wired and/or wireless networks, including, but not limited to, a cellular network, a wide area network (WAN) (e.g., the Internet), or a local area network (LAN). For example, statistical set updating system 104A can communicate with one or more external systems, sources and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, statistical set updating system 104A can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and software that facilitates communicating information among statistical set updating system 104A and external systems, sources and/or devices (e.g., computing devices, communication devices and/or the like).

Statistical set updating system 104A can comprise one or more computer and/or machine readable, writable and/or executable components and/or instructions that, when executed by processor 118 (e.g., a classical processor, a quantum processor and/or the like), can facilitate performance of one or more operations defined by such component(s) and/or instruction(s). Further, in numerous embodiments, any component associated with statistical set updating system 104A, as described herein with or without reference to the various figures of the one or more embodiments, can comprise one or more computer and/or machine readable, writable and/or executable components and/or instructions that, when executed by processor 118, can facilitate performance of one or more operations defined by such component(s) and/or instruction(s). For example, providing component 120, selecting component 122, computing component 124, monitoring component 126, interfacing component 128 and/or any other components associated with statistical set updating system 104A as disclosed herein (e.g., communicatively, electronically, operatively and/or optically coupled with and/or employed by statistical set updating system 104A), can comprise such computer and/or machine readable, writable and/or executable component(s) and/or instruction(s). Consequently, according to numerous embodiments, statistical set updating system 104A and/or any components associated therewith as disclosed herein, can employ processor 118 to execute such computer and/or machine readable, writable and/or executable component(s) and/or instruction(s) to facilitate performance of one or more operations described herein with reference to statistical set updating system 104A and/or any such components associated therewith.

Statistical set updating system 104A can facilitate (e.g., via processor 118) performance of operations executed by and/or associated with providing component 120, selecting component 122, computing component 124, monitoring component 126, interfacing component 128 and/or another component associated with statistical set updating system 104A as disclosed herein. For instance, as described in detail below, statistical set updating system 104A can facilitate via processor 118 (e.g., a classical processor, a quantum processor and/or the like): computing, including averaging and/or training, of a plurality of statistical sets; providing iterated averaged statistical sets; communicating among nodes of a system according to a randomization pattern; selecting communicating subsets of the nodes according to the randomization pattern; and/or interfacing with an entity to provide a status regarding the computations and/or regarding convergence rate to consensus of the statistical set(s) being updated, to be described below in detail. As will be apparent from the below, one or more statistical sets being updated can be differing versions relative to one another and/or can be portions of one or more common parent statistical sets. The one or more statistical sets acted upon by the statistical set updating system 104A can include, while not being limited to, an ML model, gradient, optimized and/or transformed data, parameter and/or similar.

Turning now to additional aspects illustrated at FIG. 1, such as the components of the statistical set updating system 104A as illustrated in FIG. 1, further functionality of the statistical set updating system 104A will be described. Additional description of functionalities will be further described below with reference to the example embodiments of FIGS. 2 and 3, where repetitive description of like elements and/or processes employed in respective embodiments is omitted for sake of brevity.

Looking first to a non-component aspect, the statistical set updating system 104A has a statistical set 110A associated therewith. Additionally, each of the statistical set updating systems 104B and 104C illustrated at FIG. 1, and comprised by the system 100, have associated therewith a respective statistical set 110B or 110C. For example, the statistical set 110A can be stored at the memory 116 of the statistical set updating system 104A. Alternatively, by way of a non-limiting example, statistical set 110A can be stored at a memory/storage external to the statistical set updating system 104A or even at a node separate from the node 102A comprising the statistical set updating system 104A, such as a cloud computing node 910 of a cloud computing environment 950 (FIG. 9).

The following description of operations performed by components of the statistical set updating system 104A is equally applicable to the statistical set updating systems 104B and 104C. As will be appreciated, the randomized distributed updating performed by the system 100, such as by the statistical set updating system 104A, enables a plurality of statistical set updating systems to perform operations concurrently. This can result in increasing the decentralized distributed updating efficiency as performed by systems other than those of embodiments described herein. For example, a convergence rate to consensus of the statistical sets being updated can be increased relative thereto, with the increase itself resulting in decreased communication cost among the statistical set updating systems involved, and/or also more quickly freeing up processing power and/or memory at the statistical set updating systems involved.

Further, the following description refers to the updating, such as averaging and/or training, of a plurality of statistical sets, such as the statistical sets 110A, 110B and 110C accessed by a plurality of systems disposed at a plurality of respective decentralized locations, such as nodes 102A, 102B and 102C. However, it will be appreciated that the statistical set updating system 104A, and/or statistical set updating systems 104B and 104C, can be employed to update one or more additional statistical sets simultaneously, subsequently or in any suitable order. An additional such statistical set can be a version and/or portion of a plurality of statistical sets accessed by an additional plurality of systems disposed at an additional plurality of respective decentralized locations, such as nodes, such that not all of the same nodes 102A, 102B and 102C are included. It also will be appreciated that while the nodes 102A, 102B and 102C are illustrated each as including respective statistical sets 110A, 110B and 110C, as indicated above, any one or more statistical sets can be stored other than at the respective statistical set updating systems 104A, 104B and 104C and respectively provided by the respective statistical set updating systems 104A, 104B and 104C.

Figure 8:
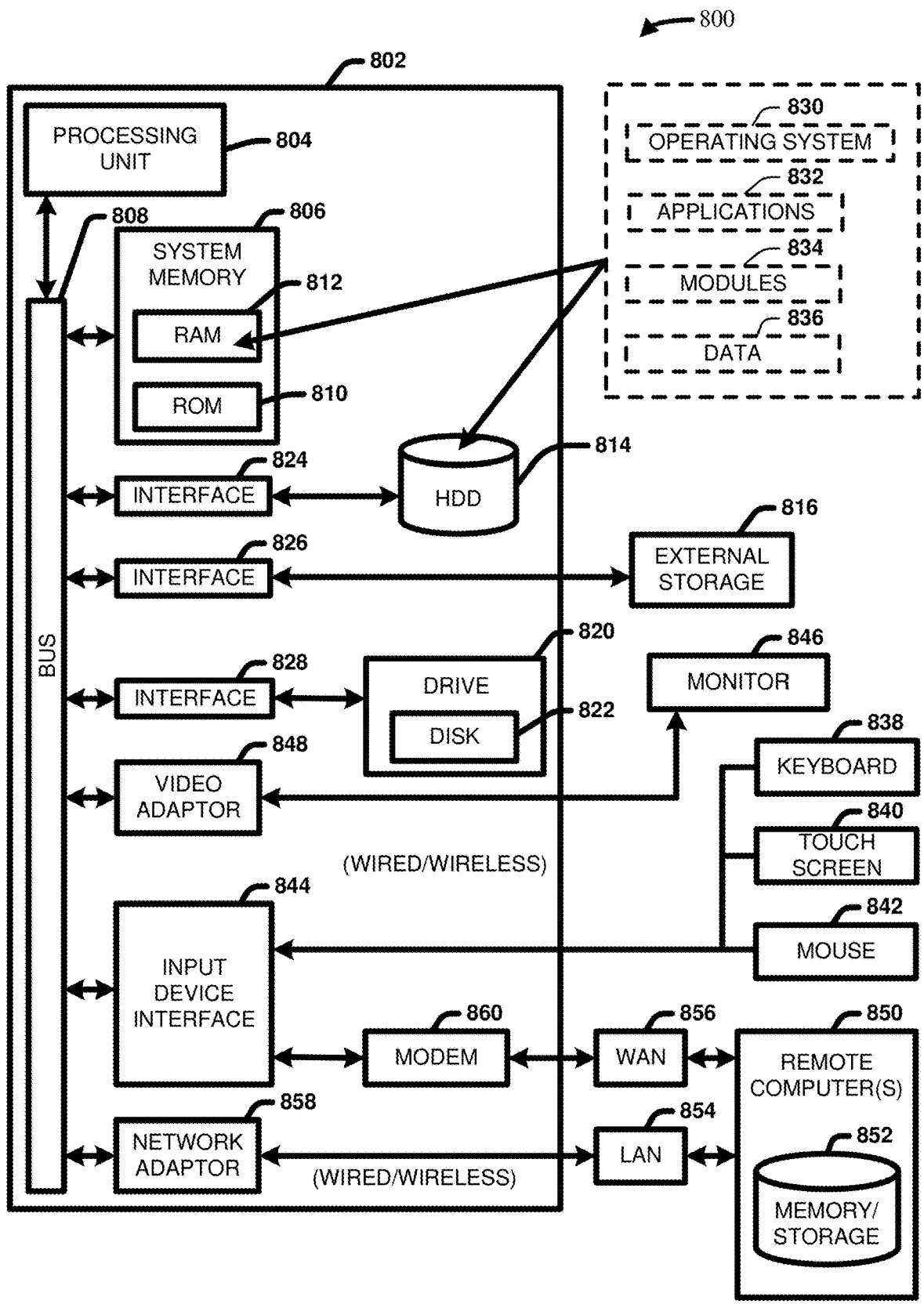
FIG. 8 illustrates a block diagram of an example, non-limiting operating environment in which one or more embodiments described herein can be facilitated.

The providing component 120 can employ any one or more aspects of an operating environment, such as the operating environment 800 illustrated at FIG. 8, to provide, such as to receive and/or retrieve, a statistical set to be updated, such as statistical set 110A. By way of a non-limiting example, statistical set 110A can be uploaded from the HDD 814, received from the memory/storage 852 via the WAN 856 and/or downloaded via the WAN 856 from a node, such as a cloud computing node 910 of a cloud computing environment 950 (FIG. 9). Alternatively, any one or more of the respective statistical sets 110A, 110B or 110C can instead be identified and employed in the respective updating performed by the respective statistical set updating systems 104A, 104B and 104C without being received and/or retrieved.

The selecting component 122 can select an additional system from which an additional statistical set compatible with the statistical set 110A can be obtained. That is, the statistical set 110A and the additional statistical set (e.g., 110B or 110C) are compatible with one another, such as being different versions or portions of a common parent statistical set, and/or comprising related statistics, such as regarding the same subject matter(s). For example, compatible statistical sets can each be a portion and/or version of a common ML model. Accordingly, the selecting component 122 can determine a comprehensive set of available additional systems each having an additional statistical set being compatible with the statistical set 110A. The comprehensive set of available additional systems includes a plurality of additional systems (e.g., the statistical set updating systems 104B and 104C) comprising or having access to (e.g., able to receive, retrieve, identify and/or like function) one or more additional statistical sets (e.g., 110B or 110C) compatible with the statistical set 110A. That is, these statistical sets make up a comprehensive set of statistical sets being compatible with one another. Further, it will be appreciated that the updating performed by the statistical set updating system 104A can be performed among any suitable number of statistical sets.

In one or more embodiments, the selecting component 122 can access a database having locations of a comprehensive set of all compatible statistical sets (e.g., the statistical set 110A and the plurality of additional statistical sets 110B and 110C) and/or of their associated accessing systems (i.e., the statistical set updating system 104A and the plurality of additional systems 104B and 104C). The database can be stored at a memory of the respective statistical set updating system, stored at an external memory/storage, accessible via an associated cloud computing environment and/or the like.

In one or more embodiments, the selecting component 122 can actively search for one or more additional systems from which the additional statistical set can be obtained, such as until the respective searching is exhausted. In one or more embodiments, the selecting component 122 can actively search for one or more additional statistical sets compatible with the statistical set 110A.

Further, it will be appreciated that the comprehensive set of the compatible statistical sets can be selectively modified, such as by a user entity (e.g., a machine, device, component, hardware, software or human) to indicate that one or more of the compatible statistical sets should not be accessed, and/or one or more of the compatible statistical sets can be removed from the comprehensive set (e.g., from the database), such as temporarily or permanently, for example. One or more respective selective modifications can be made at any suitable time prior to, during and/or after any operation being performed by the statistical set updating system 104A to allow for active modification of the updating performed by the statistical set updating system 104A. The selective modification(s) can be made by way of any suitable interfacing with the statistical set updating system 104A. For example, a human user entity can access one or more wired/wireless input devices of the statistical set updating system 104A to enable the interfacing.

As will be appreciated, each of the additional systems of the plurality of additional systems determined by the selecting component 122 can be and/or have associated therewith a respective statistical set updating system. Further, although the additional systems 104B and 104C each are statistical set updating systems, it will be understood that an additional system selected by the selecting component 122 can comprise or be able to access a compatible additional statistical set but not also be a statistical set updating system similar to embodiments of those described herein, such as the statistical set updating system 104A.

By way of example, FIG. 1 illustrates a pair of additional systems 104B and 104C that have associated therewith (that is, from which the statistical set updating system 104A can obtain) a pair of respective additional statistical sets 110B and 110C. A comprehensive set of the statistical set updating system 104A and the additional systems 104B and 104C, and/or of the statistical set 110A and the additional statistical sets 110B and 110C, can be provided at a database stored at the memory 116, stored at an external memory/storage, accessible via an associated cloud computing environment and/or the like. As indicated above, this comprehensive set can be selectively modified by a user entity. The statistical sets 110A, 110B and 110C each are compatible with one another, such as having a common parent statistical set and/or being versions and/or portions of one another. For example, each of the statistical sets 110A, 110B and 110C can be a portion or version of a common ML model. Each of the statistical set updating system 104A and the pair of additional systems 104B and 104C are decentralized from one another, although it will be appreciated that in one or more embodiments, one or more additional systems can be centralized relative to one or more other of the one or more additional systems. Further each of the additional system 104B and 104C is a statistical set updating system.

To facilitate the selection of the additional system and/or statistical set, the selecting component 122 can employ a randomization pattern. The randomization pattern can be implemented via a randomization algorithm 140 associated with the selecting component 122. It will be appreciated that the randomization algorithm 140 and/or instructions for implementing the randomization algorithm 140, can be stored at the selecting component 122, memory 116, and/or an external memory/storage, accessible via an associated cloud computing environment and/or the like. Generally, the randomization algorithm 140 can determine the comprehensive set of compatible statistical sets from the selecting component 122 and can randomly select one additional statistical set of the available plurality of additional statistical sets with which to compute an averaged statistical set from, i.e. from an averaging of the statistical set 110A and the selected additional statistical set, and thus also can select a respective selected additional system, associated with the selected additional statistical set, with which the statistical set updating system 104A should communicate to obtain the selected additional statistical set. The pair of the statistical set updating system 104A and the selected additional system are thus a communicating subset of the comprehensive set of systems.

The randomization pattern employed by the randomization algorithm 140 can be written to utilize any suitable random selection technique, such as simple random selection, stratified random selection, cluster random selection and/or systematic random selection. Randomization can occur at any level of granularity such as, but not limited to: among all statistical sets of the comprehensive set of all statistical sets; among only one or more groups of statistical sets, where the statistical sets within each group and/or the number of groups are randomly and/or selectively determined; among only two or more statistical sets of one or more groups; and/or any combination thereof.

Randomization can be different among one or more levels of granularity, groups and/or one or more subsets of the groups. Differences in randomization can include use of a different, aforementioned random selection technique and/or can include one or more randomly or selectively determined limits on communication among nodes (e.g., learners) of a comprehensive set of all nodes having one or more systems of the aforementioned comprehensive set of systems (e.g., including the statistical set updating system 104A and the additional systems 104B and 104C). For example, a limit can be set with regards to what nodes are enabled to communicate with one another. For example, all nodes of the comprehensive set of nodes can be randomly and/or selectively distributed within a communication topology figuratively represented as a decentralized pattern, such as a ring or other suitable connection pattern. The arrangement can be constructed by the statistical set updating system 104A, such as by the selecting component 122, and/or by one or more of the additional systems of the comprehensive set of systems comprised by the comprehensive nodes. For example, the communication topology can be a ring within which each node can communicate with each other node. See, e.g., the communication topology illustrated at FIG. 3, to be discussed in further detail below. In another example, the communication topology can be a ring within which each node can communicate with less than all other nodes. The aforementioned selective determinations can be made by a user entity by way of any suitable interfacing with the statistical set updating system 104A. For example, a human user entity can access one or more wired/wireless input devices of the statistical set updating system 104A to enable the interfacing.

It also will be appreciated that the randomization pattern of the randomization algorithm 140 can change at a randomly or selectively determined frequency, such as, but not limited to: every iteration; every x-number of iterations where x can be any suitable number less than or greater than an epoch; every epoch and/or every y-number of epochs where y can be any suitable number; upon reaching a randomly or selectively determined convergence rate of the statistical set 110A and/or a selected percentage of similarity (e.g., of complete consensus) of the statistical set 110A as compared to a complete convergence among the statistical set 110A and the plurality of additional statistical sets (e.g., statistical sets 110B and 110C) (e.g., as determined by the monitoring component 126, to be described below in further detail); and/or any combination thereof. The aforementioned selective determinations can be made by a user entity by way of any suitable interfacing with the statistical set updating system 104A. For example, a human user entity can access one or more wired/wireless input devices of the statistical set updating system 104A to enable the interfacing. The change in the randomization pattern employed by the randomization algorithm 140 can include a change in an order of communication among the system and the plurality of additional systems. For example, the figurative shape of the communication topology can be changed and/or an aforementioned limit changed with respect to the communication topology. In another example, the levels at which randomization can occur can themselves be reconstructed.

Turning next to the computing component 124, the component can receive an indication of the selected additional statistical set and associated selected additional system by any suitable method of communication with the selecting component 122. The computing component 124 then can average the statistical set 110A with the selected statistical set. The averaging computation can be performed via a computation algorithm 142. In one instance, the averaging computation can be conducted under a doubly stochastic matrix for convergence guarantee, with the sum of the weights among the plurality of involved systems being one. For example, [0.3, 0.4, 0.3] for a 3-system averaging. It will be appreciated that the computation algorithm 142 and/or instructions for implementing the computation algorithm 142, can be stored at the computing component 124, memory 116 and/or external memory/storage, accessible via an associated cloud computing environment and/or the like.

The averaging computation performed can result in an averaged statistical set. That is, upon an initial iteration comprising the statistical set 110A, the statistical set 110A itself is modified and/or replaced, and thus becomes an averaged statistical set 110A. Accordingly, as used herein, the terms statistical set 110A and averaged statistical set 110A can be used interchangeably. Likewise, the terms statistical set 110B or 110C can be used interchangeably, respectively, with the terms averaged statistical set 110B and 110C.

It will be appreciated that the selecting component 122 can perform more than one selection at a rate that can be other than 1-to-1 with the computation performed by the computing component 124 for each of the selections made by the selecting component 122. Additionally, or alternatively, it will be appreciated that the operations performed by the selecting component 122 and the computing component 124 can be scaled where suitable, such as where processing power and/or memory to perform the associated operations is available. For example, the selecting component 122 and/or computing component 124 can be instructed, such as by the user entity interfacing with the statistical set updating system 104A as aforementioned, to perform two or more iterations of the aforementioned processes performed by these components at least partially concurrently with the base iteration (i.e., the selecting and computing operations discussed above). The number of iterations at least partially concurrently performed can be limited by the available processing power and/or memory available to the statistical set updating system 104A, the determination of which can be made by any suitable monitoring of one or more performance aspects of the statistical set updating system 104A. For sake of brevity, the performance monitoring is not further discussed herein, although one having ordinary skill in the art will have an understanding of performance monitoring of a computer system to construct a respective computer system having the aforementioned performance monitoring capabilities.

Turning next to the monitoring component 126, this component can monitor and compare the averaged statistical set with the comprehensive set of compatible and available additional statistical sets, any of which themselves can be an averaged statistical set at any given time, such as where one or more of the additional systems also is performing respective selecting and computing operations as least partially concurrently and/or subsequently relative to the respective selecting and computing operations performed by the statistical set updating system 104A (e.g., by a respective selecting component and computing component). This monitoring can employ any suitable technique to make the related statistical set comparison and associated determination of convergence rate of the statistical set 110A and/or percentage of similarity (e.g., of complete consensus) of the statistical set 110A as compared to a complete convergence among the statistical set 110A and the plurality of additional statistical sets (e.g., statistical sets 110B and 110C). This monitoring by the monitoring component 126 can be employed at any suitable frequency. For example, the monitoring by the monitoring component 126 can detect availability of the averaged statistical sets at the respective memories after each computation is completed. It will be appreciated that full convergence can be unwanted, and thus monitoring the convergence rate to consensus to avoid issues such as overfitting can be employed.

For example, a suitable stop-gate of the selecting and computing processes (e.g., by the selecting component 122 and the computing component 124) can be selectively provided to the statistical set updating system 104A (e.g., to the monitoring component 126), such as by a user entity. The stop-gate can be provided via any suitable interfacing with the statistical set updating system 104A. For example, a human user entity can access one or more wired/wireless input devices of the statistical set updating system 104A to enable the interfacing and thus to enable input of a suitable stop-gate. The stop-gate can comprise a selected convergence rate of the statistical set 110A and/or a threshold consensus, such as a selected percentage of similarity (e.g., of complete consensus) of the statistical set 110A as compared to a complete convergence among the statistical set 110A and the plurality of additional statistical sets (e.g., statistical sets 110B and 110C).

Until the selected stop-gate is reached, the monitoring component 126 can continue to provide indication to the selecting component 122 and to the computing component 124 to continue to perform additional iterations of their respective operations. For example, in one embodiment, the computing component 124 can average the averaged statistical set with yet another additional statistical set that is compatible with the averaged statistical set. That is, as indicated above, upon an initial iteration comprising the statistical set 110A, the statistical set 110A itself is modified and/or replaced, and thus becomes an averaged statistical set 110A. The averaging with one or more yet other additional statistical sets thereby enables computation of one or more further iterations of the averaged statistical set 110A (e.g., via the computing component 124) that is closer to a statistical set consensus than the most recently computed averaged statistical set 110A, as determined by the monitoring component 126) among the comprehensive set of statistical sets (e.g., the statistical set 110A and the additional statistical sets 110B and 110C) comprised by the comprehensive set of systems (e.g., the statistical set updating system 104A and the plurality of additional systems 104B and 104C). As will be understood by one having ordinary skill in the art, the yet another additional statistical set can be obtained from yet another selected additional system of the aforementioned plurality of additional systems (e.g., via the selecting component 122). Furthermore, for each iteration, a learner (e.g., a system such as the statistical set updating system 104A of the parent system 100), can communicate with a pair of the additional systems or more.

The interfacing component 128 can provide an indication to the user entity (e.g., a machine, device, component, hardware, software or human) to indicate, at any suitable frequency, progress being made by the statistical set updating system 104A. That is, indication can be provided to the user entity, such as in the form of a numerical quantity representing one or more of a present convergence rate of the statistical set 110A and/or a selected percentage of similarity (e.g., of complete consensus) of the statistical set 110A as compared to a complete convergence among the statistical set 110A and the plurality of additional statistical sets (e.g., statistical sets 110B and 110C). This interfacing by the interfacing component 128 can be performed by way of any suitable interfacing with the statistical set updating system 104A. For example, a human user entity can access one or more wired/wireless input devices of the statistical set updating system 104A to enable the interfacing.

Further, it will be appreciated that the processes discussed above as being performed by one or more of the components of the statistical set updating system 104A alternatively can be performed by one or more alternative components in other embodiments. That is, the software and/or hardware comprised and/or utilized by any one or more component of the statistical set updating system 104A can instead be comprised and/or utilized by a different one or more components of a respective alternative embodiment of the statistical set updating system 104A.

Figure 2:
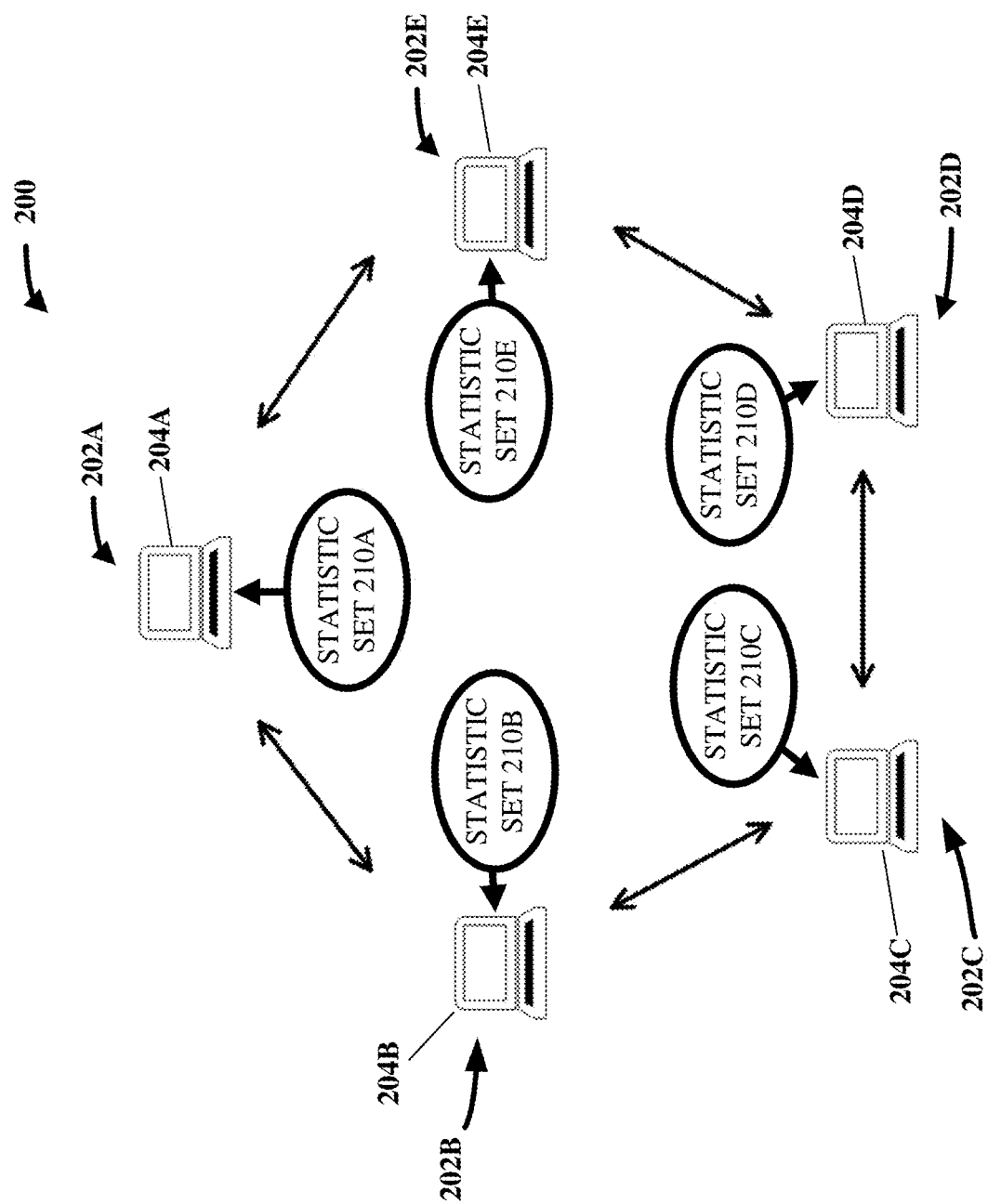
FIG. 2 illustrates a diagram of an example, non-limiting system that can facilitate updating, such as averaging and/or training, of a plurality of statistical sets, in accordance with one or more embodiments described herein.
Figure 3:
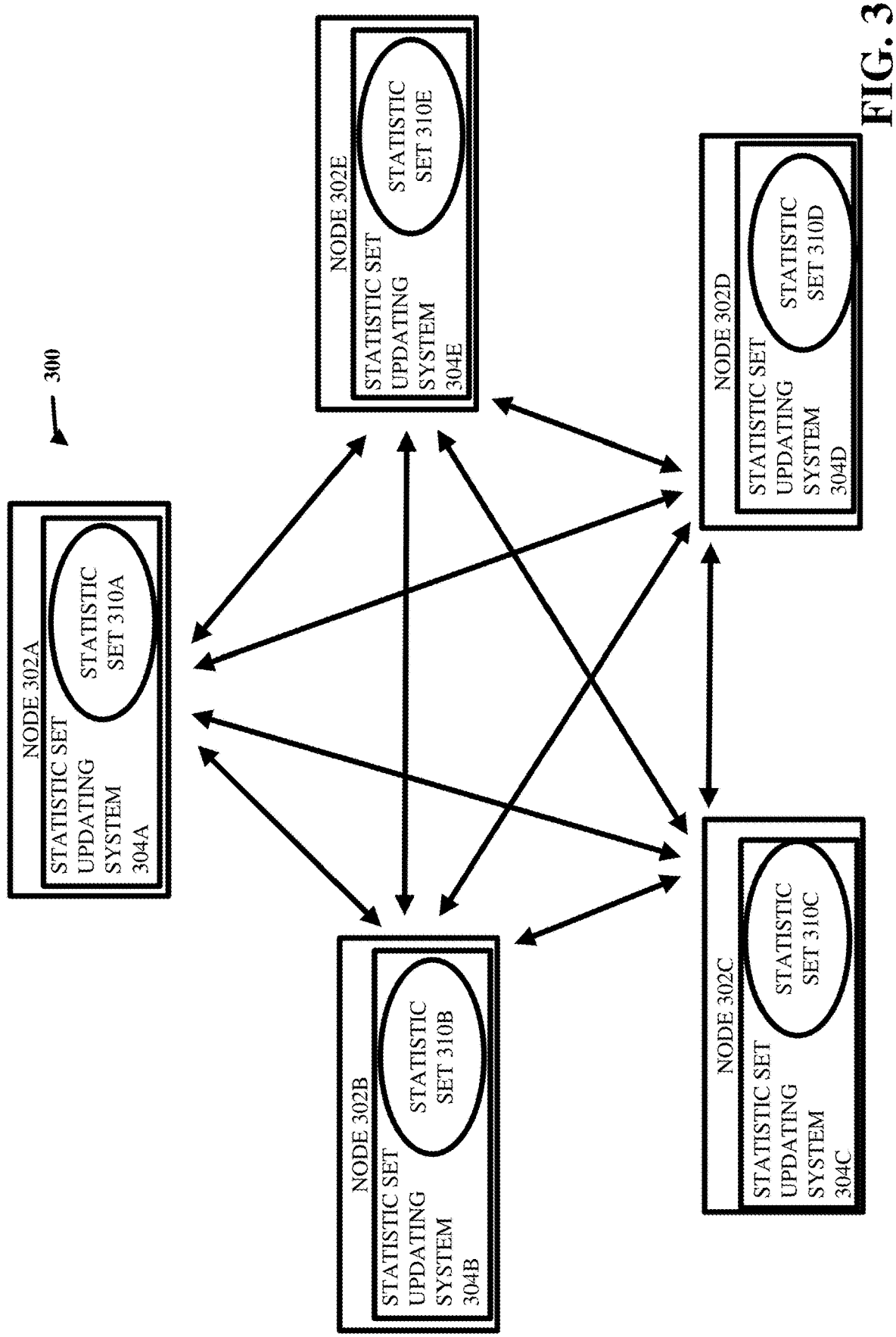
FIG. 3 illustrates a diagram of another example, non-limiting system that can facilitate updating, such as averaging and/or training, of a plurality of statistical sets, in accordance with one or more embodiments described herein.

Turning next to FIGS. 2 and 3, a pair of example communication topologies are provided to diagrammatically compare a process of randomized distributed updating performed by one or more embodiments described herein, at FIG. 3, with a process of non-randomized, fixed distributed updating, at FIG. 2. Repetitive description of like elements and/or processes employed in respective embodiments is omitted for sake of brevity.

Looking first to FIG. 2, the figure illustrates a diagram of an example, non-limiting system 200 that can perform fixed distributed updating of a plurality of statistical sets. The system 200 comprises a comprehensive set of nodes 202A, 202B, 202C, 202D and 202E comprising a comprehensive set of systems 204A, 204B, 204C, 204D and 204E each being cable of performing fixed distributed updating of one or more statistical sets, and where each of these systems has associated therewith a respective statistical set 210A, 210B, 210C, 210D and 210E of a comprehensive set of statistical sets. The systems 204A, 204B, 204C, 204D and 204E are distributed within a communication topology illustrated as a closed ring. Communication among the systems 204A, 204B, 204C, 204D and 204E is not randomized. That is, each of the systems 204A, 204B, 204C, 204D and 204E can communicate only with its neighbors in the communication topology. For example, system 204A can communicate only with systems 204B and 204E. Accordingly, a statistical set 210A only can be averaged with an additional statistical set 210B or 210E. Accordingly, for statistics from an averaged statistical set 210A to reach either of system 204C or 204D, it first is distributed halfway across the respective communication topology ring via subsequently performed iterations at neighboring systems. For example, a computation is first performed at system 204B prior to aspects of the statistical set 210A being utilized at the system 204C, that is via the prior computation of an averaged statistical set at system 204B. Accordingly, time to reach consensus and/or convergence rate for the system 200 and the respective system 204A is slower as compared to an embodiment of a statistical set updating system as described above with respect to FIG. 1. For example, the system 200 and/or the respective system 204A can utilize many more iterations of communication and/or iterations of updating as compared to an embodiment of a statistical set updating system as described above with respect to FIG. 1.

Looking next to FIG. 3, provided is an alternative illustration of a plurality of non-limiting embodiments of statistical set updating systems 304A, 304B, 304C, 304D and 304E employed in a system 300, where each of the statistical set updating systems 304A, 304B, 304C, 304D and 304E is similar to the statistical set updating system of 104A of FIG. 1, and each can address one or more of the problems associated with the systems 204A, 204B, 204C, 204D and 204E of the embodiment of FIG. 2. The statistical set updating systems 304A, 304B, 304C, 304D and 304E can facilitate the updating of one or more statistical sets, in accordance with one or more embodiments described herein.

The system 300 comprises a comprehensive set of nodes 302A, 302B, 302C, 302D and 302E comprising a comprehensive set of systems 304A, 304B, 304C, 304D and 304E each being cable of performing fixed distributed updating of one or more statistical sets, and where each of these systems has associated therewith a respective statistical set 310A, 310B, 310C, 310D or 310E of a comprehensive set of statistical sets. Different from any of the systems 204A, 204B, 204C, 204D and 204E of the system 200, each of the systems 304A, 304B, 304C, 304D and 304E of the system 300 is a statistical set updating system according to one or more embodiments described herein.

That is, referring to the statistical set updating system 304A, but applicable to any of the additional statistical set updating systems 304B, 304C, 304D and 304E, the statistical set updating system 304A can perform randomized distributed updating of one or more statistical sets. Further, while the systems 204A, 204B, 204C, 204D and 204E are distributed within a communication topology illustrated as a closed ring, communication among the systems 304A, 304B, 304C, 304D and 304E is randomized and is not fixed. That is, each of the systems 204A, 204B, 204C, 204D and 204E can communicate only with its neighbors in the communication topology, while any of the systems 304A, 304B, 304C, 304D and 304E can communicate with one another. For example, system 204A can communicate only with systems 204B and 204E. On the other hand, a statistical set 310A can be averaged with any of the additional statistical sets 310B, 310C, 310D or 310E. Accordingly, for statistics from an averaged statistical set 310A to reach either of system 304C or 304D, only one iteration of updating, such as averaging of statistics, is performed. Accordingly, time to reach consensus and convergence rate for the system 300 and the respective system 304A can be faster as compared to an embodiment of the system 204A as described above with respect to FIG. 2. That is, as described with reference to one or more components or aspects illustrated in FIG. 1, a respective selecting component of the statistical set updating system 304A can utilize a respective randomization algorithm to average the statistical set 310A with whichever of the additional statistical sets 310B, 310C, 310D or 310E is selected by the respective selecting component for each computation iteration by the respective computing component.

Still referring to FIG. 3, and to the system 300, an example algorithm employed by the statistical set updating systems 304A, 304B, 304C, 304D and 304E is provided below. In the example algorithm, a statistical set, for example an ML model utilized for providing one or more gradients, can be updated among a plurality of distributed learners, i.e. the statistical set updating systems 304A, 304B, 304C, 304D and 304E. As a result, an updated final ML model can be produced, which is the average of the ML models from all learners, l. With respect to the example algorithm, any one or more embodiments of a randomization algorithm discussed herein, such as the randomization algorithm 140, can be utilized to randomly select the communication sub-graph, as provided in the example algorithm below.

---

Example Algorithm:

Input: Same initial local model $w_0^{(l)} = w_0$; local batch size M;
   total number of iterations K; learning rate schedule $\{\alpha_k\}$.
for k = 1 : K do
|    // for each learner l
|    Run concurrently
|      Gradient computation
|        Sample a mini-batch of size M;
|        Use the current local model $w_k^{(l)}$ to compute gradient

| $$g_k = \frac{1}{M}\sum_{m=1}^{M} \exists f(w_k^{(l)}; \xi_{k,m}^{(1)});$$

|    Statistical set averaging
|    Select a statistical set for averaging (e.g. model parameters)
|    Randomly select a communication sub-graph for averaging
|    ($T_k = [t_{ij}^k]$)
|    Average the statistical set among the learners in the sub-graph
|    Local model update

| $$w_{k+1}^{(l)} = w_{k+\frac{1}{2}}^{(l)} - \alpha_k g_k^{(l)};$$

end
Output the final model as the average of models from all learners $$w_K = \frac{1}{L}\sum_{l=1}^{L} w_K^{(l)}$$

---

Figure 4:
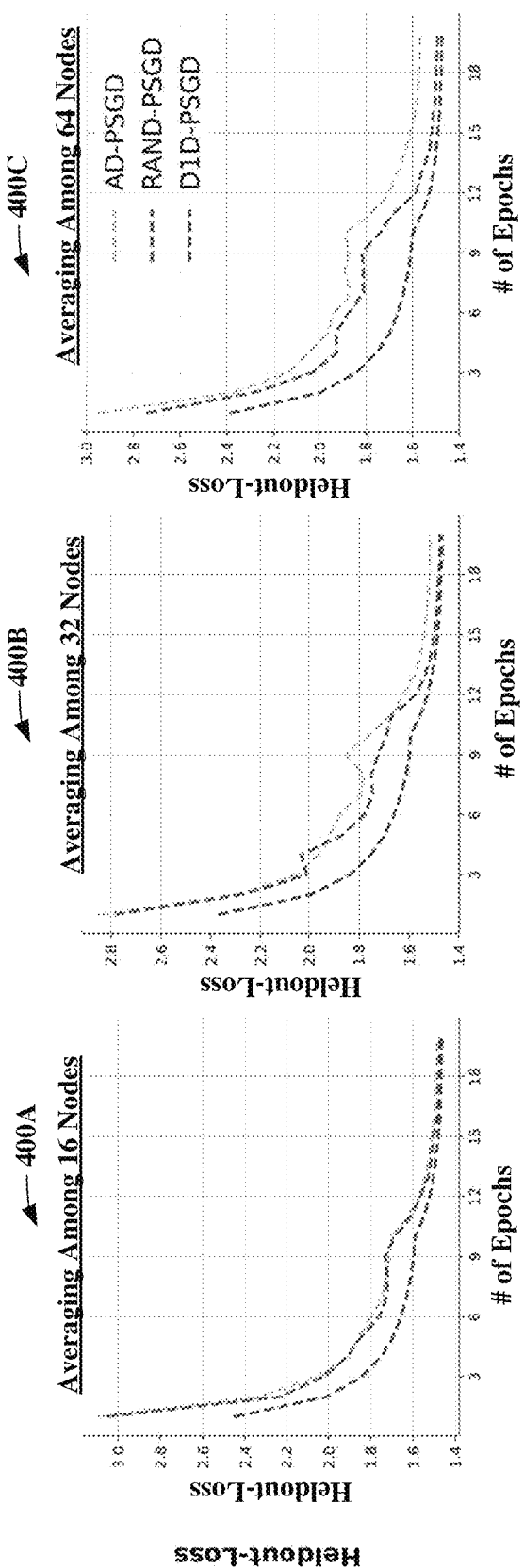
FIG. 4 illustrates a plurality of graphs showing holdout loss versus number of epochs of statistical set averaging completed, in accordance with one or more embodiments described herein.
Figure 5:
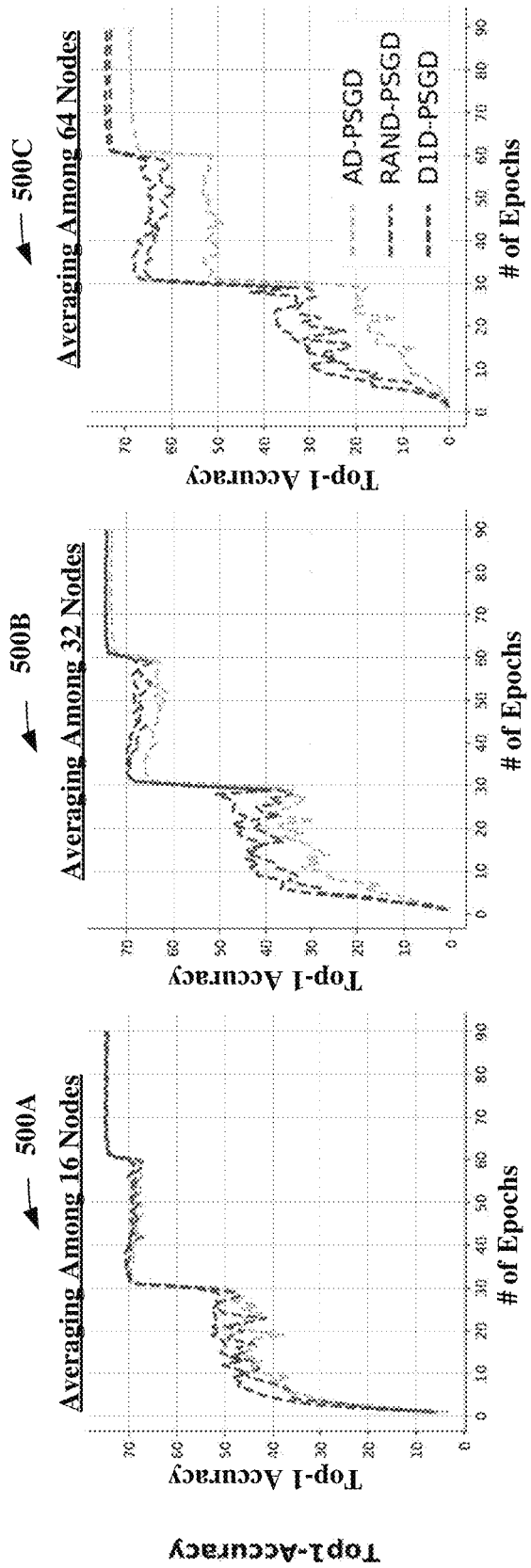
FIG. 5 illustrates a plurality of graphs showing top-1 accuracy versus number of epochs of statistical set averaging completed, in accordance with one or more embodiments described herein.
Figure 6:
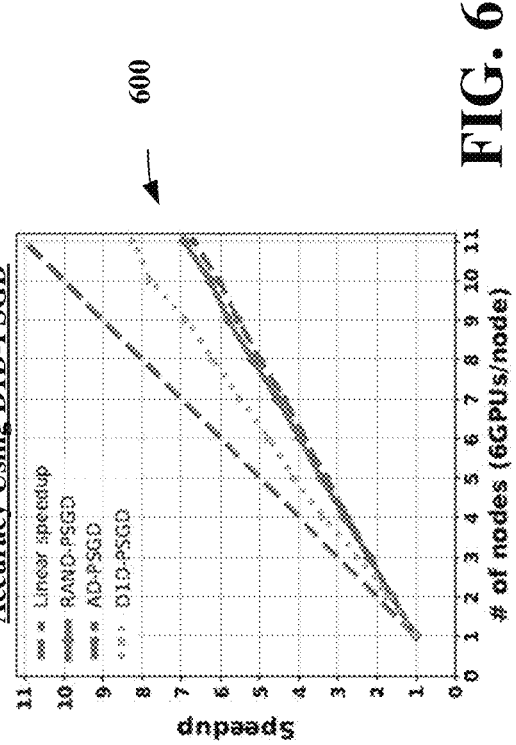
FIG. 6 illustrates a graph showing speedup versus number of nodes utilized, in accordance with one or more embodiments described herein.

Turning next to FIGS. 4 to 6, a plurality of data is illustrated with respect to an experiment including use of a randomization algorithm (Randomized Accelerated Decentralized Parallel Stochastic Gradient Descent or RAND-PSGD), such as randomization algorithm 140, employed by a statistical set updating system, such as the statistical set updating systems 104A or 304A, as compared to use of an asynchronous fixed distribution algorithm (Asynchronous Decentralized Parallel Stochastic Gradient Descent or AD-PSGD), such as employed by system 204A with reference to FIG. 2, and an upper bound provided by a "delay by one" algorithm ("Delay by One" Decentralized Parallel Stochastic Gradient Descent or D1D-PSGD, to be discussed below in detail.

At FIGS. 4 to 6, a plurality of graphs is provided demonstrating an exemplary use of a statistical set updating system according to one or more embodiments described herein. FIGS. 4 to 6, demonstrate a pseudo-real-world comparison of use of an embodiment of the statistical set updating systems described herein, such as with reference to FIGS. 1 and 3, as compared to use of a system providing only fixed distributed updating, such as with reference to FIG. 2.

Turning now to the aforementioned algorithms, as compared to a synchronous decentralized parallel stochastic gradient descent (S-PSGD), AD-PSGD can replace global weight synchronization with model averaging among neighboring learners (e.g., nodes) in a peer-to-peer strategy while achieving a same or similar convergence rate. Also, AD-PSGD can converge with a much larger batch size than S-PSGD, which can enable a comparatively larger degree of parallelism for distributed training. However, with reference to AD-PSGD, a spectral gap of a respective mixing matrix can decrease when the number of learners in the system increases, thus hampering convergence. That is, as generally demonstrated at FIGS. 4 and 5, convergence can slow as the number of learners increases. Alternatively, RAND-PSGD can improve the spectral gap while minimizing the communication cost, as compared to AD-PSGD.

Turning now to the calculations underlying the graphs of FIGS. 4 to 6, stochastic gradient descent (SGD) is presently a dominant approach to optimizing deep neural networks, as appreciated by those having ordinary skill in the art. In SGD, models can be iteratively updated as shown in Eq. 1, below.

$$w_{k+1} = w_k - \alpha_k * \left[\frac{1}{M}\sum_{m=1}^{M} \nabla f(w_k; \varepsilon_{k,m})\right] \quad \text{Eq. 1}$$

In Eq. 1, $w_k$ are the parameters after iteration k. The gradient $\nabla_f(w_k; \varepsilon_{k,m})$ is computed using model $w_k$ on M randomly drawn statistic samples indexed by the random variable $\varepsilon_{k,m}$. The M samples form a mini-batch and M is the batch size. $\alpha_k$ is the learning rate.

In AD-PSGD, the weights update rule is given in Eq. 2, provided below.

$$W_{k+1} = W_k * T - \alpha_k * g(\Phi_k, \varepsilon_k) \quad \text{Eq. 2}$$

In Eq. 2, $W_k = [w_k^{(1)}, \ldots, w_{k(l)}, \ldots, w_k^{(L)}]$ is a matrix with each column consisting of model parameters in each learner l at iteration k; T is a doubly stochastic mixing matrix for modeling averaging among learners given a network topology; $\Phi_k = [\hat{~}_k^{(1)}, \ldots, \hat{~}_k^{(l)}, \ldots, \hat{~}_k^{(L)}]$ is a matrix with each column consisting of model parameters used for computing gradient in each learner l at iteration k. In the asynchronous mode, $\hat{~}_k^{(l)}$ may not be equal to $w_k^{(l)}$; $\varepsilon_k = [\varepsilon_k^{(1)}, \ldots, \varepsilon_k^{(l)}, \ldots, \varepsilon_k^{(L)}]$ is a matrix with each column consisting of indexing random variables for mini-batch samples used for computing gradients in each learner l at iteration k and $g(\Phi_k, \varepsilon_k) =$ $$\left[\frac{1}{M}\sum_{m=1}^{M} \nabla f(\hat{w}_k; \varepsilon_{k,m}), \ldots, \frac{1}{M}\frac{1}{M}\sum_{m=1}^{M} \nabla f(\hat{w}_k; \varepsilon_{k,m})\right]$$

is a matrix with each column consisting of gradients computed in each learner l at iteration k. In S-PSGD, all models can be collected and averaged by the total number of L after all learners finish their gradient computation and local model update. The average can then broadcast to each learner. That is, the mixing matrix $$T_u = \frac{1}{L}(1_L 1_L^T) \text{ where } 1_L = [1, 1, \ldots, 1]^T.$$

Thus, S-PSGD is a special case of AD-PSGD.

The mixing strategy in S-PSGD with $T_u$ can be fast to reach consensus but it can be communication heavy as models have to be transferred among all learners. Thus, to reduce the communication cost, local averaging can be used. For instance, each learner only can average models with its left and right neighbors in a ring, i.e., via fixed distributed training. In this case, the mixing matrix is given by Eq. 3, shown below.

$$T_0 = \begin{bmatrix} \frac{1}{3} & \frac{1}{3} & & & & & \frac{1}{3} \\ \frac{1}{3} & \frac{1}{3} & \frac{1}{3} & & & & \\ & \frac{1}{3} & \frac{1}{3} & \ddots & & & \\ & & \ddots & \ddots & \frac{1}{3} & & \\ & & & \frac{1}{3} & \frac{1}{3} & \frac{1}{3} & \\ \frac{1}{3} & & & & \frac{1}{3} & \frac{1}{3} \end{bmatrix} \quad \text{Eq. 3}$$

In this case, each learner can communicate only with its immediate neighbors, and thus the communication can be significantly reduced compared to averaging across all learners. For example, it can be shown that, as a doubly stochastic matrix $T_0$ will converge to $T_u$:

$$T_0^k \to T_u, k \to \infty. \quad \text{Eq. 4}$$

The speed of convergence can be controlled by the spectral gap between the largest (always 1) and the second largest eigenvalues of $T_0$. Suppose $\rho = \max(|\lambda_2(T_0)|, |\lambda_L(T_0)|) < 1$ is the second largest eigenvalue of $T_0$. Thus:

$$\|T_0^k - T_u\|_2 \leq 2\rho^k. \quad \text{Eq. 5}$$

Given the circulant structure, the eigen values of $T_0$ can simply be the Fourier transform of the first row. The second largest eigenvalue is given by:

$$\rho = \frac{1}{3} + \frac{2}{3}\cos\left(\frac{2\pi}{L}\right). \quad \text{Eq. 6}$$

When L is large, $\rho$ is very close to 1, which indicates a small spectral gap and therefore a slow convergence to consensus.

Alternatively, a randomized mixing strategy provided by RAND-PSGD, such as utilizing a statistical set updating system according to one or more embodiments as described herein, can be used to accelerate the convergence, such as without increasing the communication cost as compared to S-PSGD. According to a randomized mixing strategy, L learners can form a ring and the indices of the learners can be randomly shuffled:

$$[1,2,\ldots,L] \to [\sigma(1), \sigma(2), \ldots, \sigma(L)] \qquad \text{Eq. 7}$$

where $\sigma(\cdot)$ is a random permutation of the set $\{1, \ldots, L\}$. A learner can average models with its left and right neighbors in the mapped indices. The resulting mixing matrix $T_\tau$ of iteration $\tau$ constructed this way can be a doubly stochastic matrix, thus providing $$T_\tau = P^T T_0 P \qquad \text{Eq. 8}$$

where P is a random permutation matrix. Moreover, $$\tilde{T} = E_o[T_\tau^T T_\tau] = E_o[P^T T_0^T T_0 P]. \qquad \text{Eq. 9}$$

Thus, it can be shown that $$\tilde{T}_{ii} = \frac{1}{3}, \tilde{T}_{ij} = \frac{2}{3(L-1)}, i \neq j. \qquad \text{Eq. 10}$$

It follows that $$E\|T_1 T_2 \ldots T_k - T_u\|_2^2 \qquad \text{Eq. 11}$$
$$\leq E\|T_1 T_2 \ldots T_k - T_u\|_2^2$$
$$= E[tr((T_1 T_2 \ldots T_k - T_u)^T (T_1 T_2 \ldots T_k - T_u))]$$
$$= -1 + tr(\tilde{T}^k)$$
$$= (L-1)\left(\frac{1}{3} - \frac{2}{3(L-1)}\right)^k \leq \frac{L-1}{3^k}, \text{ which gives}$$
$$E\|T_1 T_2 \ldots T_k - T_u\|_2 \leq \frac{\sqrt{L-1}}{(\sqrt{3})^k}. \qquad \text{Eq. 12}$$

By comparing Eq. 12 with Eqs. 5 and 6, it will be appreciated that the previously described randomized mixing strategy can converge much faster to consensus than the fixed mixing strategy in Eq. 3.

Turning next to the algorithms AD-PSGD, RAND-PSGD and D1D-PSGD, in AD-PSGD, a learner can calculate gradients in one thread while concurrently exchanging its weights with its left and right neighbors in another thread. Differently, in RAND-PSGD, a learner can pick two random neighbors to communicate with in each iteration. That is, in each iteration, each learner can generate a random permutation of all the learner IDs to construct a communication ring, thus generating a new mixing matrix T. A learner can communicate with the two neighbors in the newly constructed communication ring. With respect to the computations as illustrated graphically in FIGS. 4 and 5, each learner started with the same random seed to guarantee that all learners generated the same random permutation, although it will be appreciated that a case can be otherwise in a real-world situation. As in AD-PSGD, each learner in RAND-PSGD can send two messages and receive two messages in each iteration. Assuming all learners are connected with the same communication switch, RAND-PSGD can have the same communication cost as AD-PSGD.

The D1D-PSGD algorithm ensures that the weights used to calculate gradients and the weights consensus differ by precisely one iteration of gradients calculation. D1D-PSGD can enable a fast speed to reach consensus while maintaining a decentralized training structure so that it can still converge under a larger batch size compared to S-PSGD, at the cost of placing a global synchronization in a separate communication thread. In D1D-PSGD, the strategy is constructed such that $W_k T$ and $g(\Phi_k, \varepsilon_k)$ on the RHS of Eq. 2 can be carried out concurrently. Further, the model averaging indicated by $W_k T$ can be realized with allreduce divided by L. See, e.g., Eq. 13, provided below. As used herein, an allreduce operation is a reduction operation, which is both associative and commutative such as summation, followed by a broadcast operation. A global summation can be an example of an allreduce operation.

$$W_k T = W_k T_u. \qquad \text{Eq. 13}$$

With respect to D1D-PSGD, the model used for computing the gradients in each learner can be the model from the previous iteration of allreduce, $$\Phi_k = [w_{k-1}^{(1)}, \ldots, w_{k-1}^{(l)}, \ldots, w_k^{(L)}], \qquad \text{Eq. 14}$$

and thus, the name "delay-by-one" decentralized parallel SGD. The difference between D1D-PSGD and S-PSGD can be that S-PSGD can entail consensus on gradients before model update, which can result in homogeneous models across learners when computing gradients. D1D-PSGD can have models updated locally on each learner using different gradients before pushing the models for allreduce across learners. This can introduce slight heterogeneity to local models that can be helpful for convergence as demonstrated in the experimental results illustrated at the graphs of FIGS. 4 and 5. With respect to such experiment, a collective communications library was utilized as the respective allreduce implementation. Further, although D1D-PSGD has a spectral gap (i.e., 1) more favorable than AD-PSGD and RAND-PSGD while incurring the same communication cost as AD-PSGD and RAND-PSGD, D1D-PSGD can entail a global synchronization (i.e., allreduce). Thus, D1D-PSGD can suffer from a straggler problem in a distributed setting and/or the communication speed can be bounded by the slowest communication link between the respective nodes.

With respect to these algorithms AD-PSGD, RAND-PSGD and D1D-PSGD, the Table A illustrated below summarizes a design choice for each of these algorithms. At Table A, a bidirectional network link is assumed, in which one learner can send and receive a message at a time. |M| is message size, which is the size of the neural network. |B| is the bandwidth between two learners.

TABLE A

|  | Consensus Convergence | Time to Communicate in Each Iteration | Straggler Avoidance |
|---|---|---|---|
| AD-PSGD | Slow | 2*|M|/|B| | Y |
| RAND-PSGD | Medium | 2*|M|/|B| | Y |
| D1D-PSGD | Fast | 2*|M|/|B| | N |

It will be appreciated that for the experiment conducted with reference to FIGS. 4 and 5, an IBM® cluster was used having a node architecture similar to the present fastest supercomputer in the world, Summit (OLCF-4) developed by IBM®. The cluster is based on IBM® POWER System AC922 nodes with IBM® POWER9 CPUs and non-IBM® GPUs all connected together with high-speed dual links totaling 50 GB/s bandwidth in each direction. Each node included 22 cores, 512 GB of DDR4 memory, 96 GB of High Bandwidth Memory (HBM2) for use by the accelerators and is equipped with 6 GPUs. Nodes were connected with MELANOX® EDR 100G INFINIBAND® interconnect technology, where each node had a combined network bandwidth of 25 GB/s. Each node was equipped with 500

GB NVM EXPRESS® (NVMe®) storage. PYTORCH® v1.1.0 and IBM® Spectrum MPI were utilized along with IBM® XL compiler suite v.16.1.1. For each learner, 4 I/O processes were used to drive the data loading.

Turning first to general results of the experiment, in a super-computer environment, where even the slowest communication link bandwidth is 25 GB/s and all computing devices are highly homogeneous, D1D-PSGD can guarantee the best convergence and can deliver near-metal runtime performance. In a cloud data center environment where network links are usually slow and the straggler problem become more prominent, an algorithm built on a global barrier, such as allreduce, can be unlikely to be deployed. Differently, RAND-PSGD can achieve convergence rate close to D1D-PSGD, while having the same or lower traffic cost as AD-PSGD, and absent reliance on global synchronization. AD-PSGD can outperform allreduce based algorithms significantly when network links are standard 10 GB/s ethernet because allreduce speed is bounded by the slowest link in the system.

The proposed algorithms RAND-PSGD and D1D-PSGD can improve the spectral gap at no extra communication cost as compared to the AD-PSGD algorithm. For example, an embodiment of the statistical set updating system 104A or 304A with reference to FIGS. 1 and 3, using a randomization algorithm 140 such as RAND-PSGD, and in combination with the other statistical set updating systems of a comprehensive set of statistical set updating systems performing the respective statistical sets updating, can provide the following: on an IBM® P9 supercomputer, the respective statistical set updating system can train an LSTM acoustic model in 2.28 hours with 7.5% WER on the Hub5-2000 Switchboard (SWB) test set and 13.3% WER on the CALL-HOME® (CH) test set using 64 V100 GPUs, and in 1.98 hours with 7.7% WER on SWB and 13.3% WER on CH using 128 V100 GPUs.

Turning now to the results provided at FIG. 4, the illustrated three graphs 400A, 400B and 400C show heldout-loss vs. number of epochs completed for statistical sets averaged among 16 nodes (at graph 400A), 32 nodes (at graph 400B) and 64 nodes (at graph 400C). These graphs represent actual experimental statistical set averagings performed on the speech recognition database SWB2000 (2000 hours switch board or SWB).

The hybrid acoustic model used in the SWB2000 experiments was a long short-term memory (LSTM) network with 6 bi-directional layers. Each layer had 1,024 cells (e.g., 512 cells in each direction). A linear projection layer with 256 hidden units was inserted between the LSTM layers and the softmax layer with 32,000 output units. The 32,000 units correspond to context-dependent hidden Markov model (HMM) states. The LSTM was unrolled with 21 frames and trained with non-overlapping feature subsequences of that length. The feature input was a fusion of 40-dim FMLLR, 100-dim i-Vector and 40-dim logmel with its delta and double delta. The total input dimensionality was 260. The model size was 165 MB. The language model was built using publicly available training data from a broad variety of sources, such as SWITCHBOARD® (SWB), FISHER® and GIGAWORD®. There were 364 4-grams built on a vocabulary of 85K words. The test set was the Hub 5 2000 evaluation set including two parts: 2.1 hours of SWITCHBOARD® (SWB) test set and 1.6 hours of CALLHOME® (CH) test set. Batch size at SWB was fixed at 8192 with respect to the graphs 400A, 400B and 400C.

Each graph 400A, 400B and 400C compares statistical set averaging as performed by three different systems: the asynchronous distributed system using a fixed distributed updating algorithm (Asynchronous Decentralized Parallel Stochastic Gradient Descent or AD-PSGD), the distributed system using a randomized distributed updating algorithm (Randomized Accelerated Decentralized Parallel Stochastic Gradient Descent or RAND-PSGD), and an upper bound provided by a "delay by one" algorithm ("Delay by One" Decentralized Parallel Stochastic Gradient Descent or D1D-PSGD). The D1D-PSGD algorithm ensures that the weights used to calculate gradients and the weights consensus differ by precisely one iteration of gradients calculation. D1D-PSGD can enable a fast speed to reach consensus while maintaining a decentralized training structure so that it can still converge under a larger batch size compared to S-PSGD, at the cost of placing a global synchronization in a separate communication thread.

As demonstrated by these graphs 400A, 400B and 400C, heldout-loss for the algorithm RAND-PGSD using randomized distributed updating lowers at a faster rate, as averaged out per each successive epoch completed, as compared to the fixed asynchronous-distributed algorithm AD-PSGD. This difference increases, and thus is more pronounced, as additional nodes are added to the comprehensive set of nodes employed in the respective statistical set averaging performed by the systems.

Turning now to the results provided at FIG. 5, the three graphs 500A, 500B and 500C show top-1 accuracy vs. number of epochs completed for statistical sets averaged among 16 nodes (at graph 500A), 32 nodes (at graph 500B) and 64 nodes (at graph 500C). Top-1 accuracy is the accuracy where true class matches with the most probable classes predicted by a respective model. Graphs 500A, 500B and 500C represent actual experimental statistical set averagings performed on an image database including hand-labeled images.

With reference to FIG. 5, the benchmark statistical set was collection of natural images. The training set was a subset of the image database used and contained 1.2 million images. The validation statistical set had 50,000 images. Each image mapped to one of the 1000 non-overlapping object categories. The particular model used was ResNet-50. Batch size at the image database used was fixed at 32 per learner with respect to these graphs.

Each graph 500A, 500B and 500C compares statistical set averaging as performed by three different algorithms: AD-PSGD, RAND-PSGD and D1D-PSGD. As demonstrated by the graphs, top-1 accuracy for the randomized algorithm RAND-PGSD using randomized distributed updating increases at a slower rate, as averaged out per each successive epoch completed, as compared to the fixed asynchronous-distributed algorithm AD-PSGD. This difference increases, and thus is more pronounced, as additional nodes are added to the comprehensive set of nodes employed in the respective statistical set averaging performed by the systems.

Turning now to the results provided at FIG. 6, graph 600 illustrates speedup versus number of nodes employed. Speedup is illustrated up to 11 nodes (i.e., 66 GPUs; 6 GPU's per node) on IBM® POWER9 Cluster. Batch size per learner is 128. As shown at graph 600, D1D-PSGD was the fastest, as the collective communications library used can implement sophisticated software pipelining to overlap message exchanges on the bidirectional network link. As compared to 1 node runtime, 11 node D1D-PSGD achieved over 8× speedup. AD-PSGD and RAND-PSGD are illustrated as having run at similar speeds.

Further, Table B summarizes the word error rate (WER) of (automatic speech recognition) ASR models trained by the AD-PSGD, RAND-PSGD and D1D-PSGD algorithms. At Table B, WER is provided after 16 epochs with 16, 32 and 64 learners. AD is short for APSGD, RAND is short for RAND-PSGD, and D1D is short for D1D-PSGD. A single learner baseline was trained with batch size 256.

TABLE B

| | Single Learner | 16 Learners | | | 32 Learners | | | 64 Learners | | |
|---|---|---|---|---|---|---|---|---|---|---|
| | Baseline | AD | RAND | D1D | AD | RAND | D1D | AD | RAND | D1D |
| SWB | 7.5 | 7.6 | 7.6 | 7.4 | 7.9 | 7.7 | 7.6 | 8.1 | 7.8 | 7.5 |
| CH | 13 | 13.2 | 13.1 | 13.3 | 13.6 | 13.4 | 13.1 | 14 | 13.4 | 13.3 |

Table C provides a representation of a tradeoff of running time and model accuracy using D1D-PSGD. The system running the D1D-PSGD algorithm could finish ASR training in under 2 hours with 128 GPUs, with slight model accuracy degradation. It is noted that when there are many learners in the system, the per learner batch size can decrease along with the computation efficiency. Additionally, when batch size per learner decreases, sample variances per learner can become larger, which can provide some explanation for the slight model accuracy degradation for 128 learners.

TABLE C

| | 16 Learners | 32 Learners | | 64 Learners | | 96 Learners | | 128 Learners | |
|---|---|---|---|---|---|---|---|---|---|
| WER(SWB/CH) | Time(hr) | WER | Time(hr) | WER | Time(hr) | WER | Time(hr) | WER | Time(hr) |
| 7.4/13.3 | 5.88 | 7.6/13.1 | 3.60 | 7.5/13.3 | 2.28 | 7.7/13.2 | 2.10 | 7.7/13.3 | 1.98 |

Figure 7A:
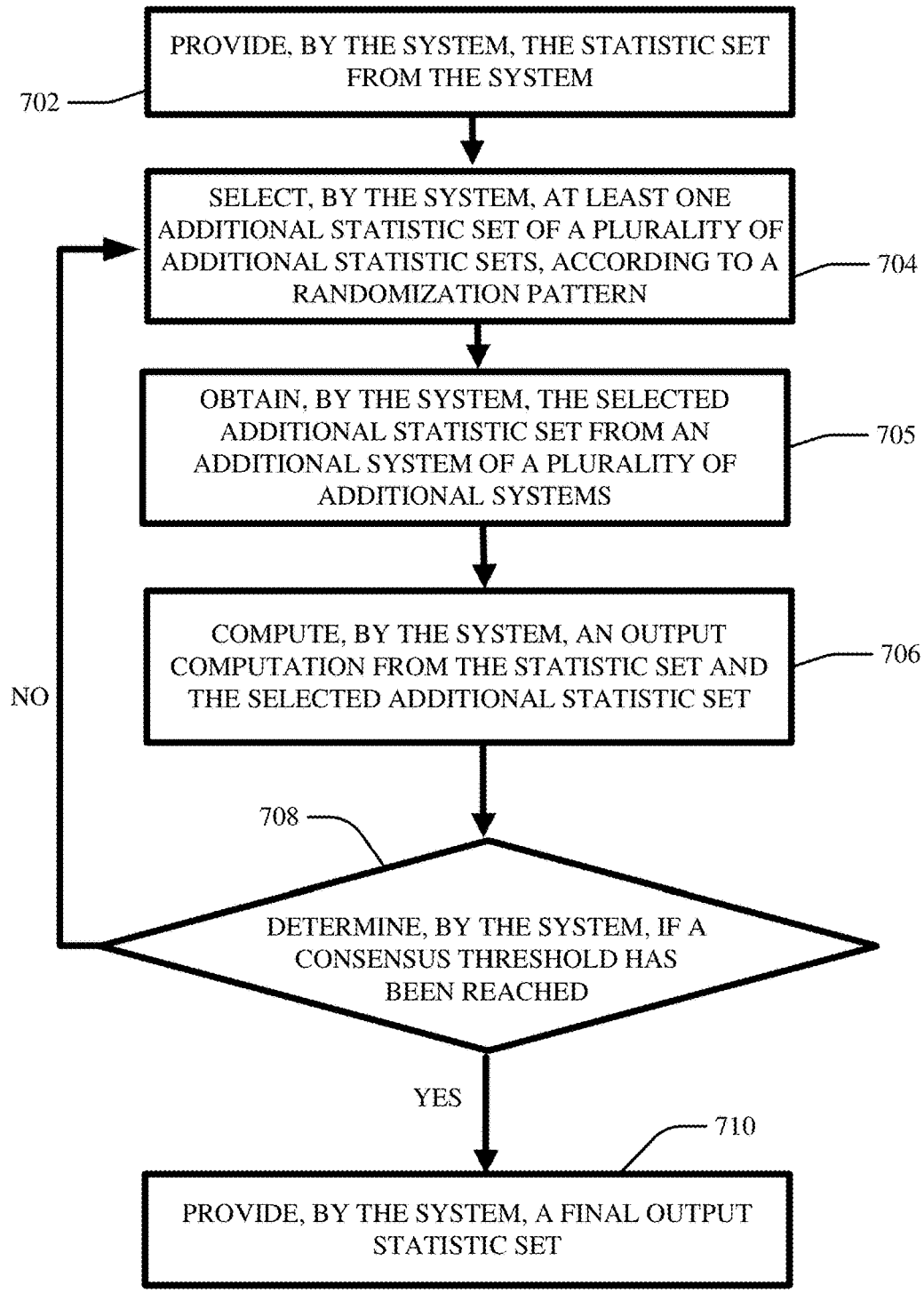
FIG. 7A illustrates a flow diagram of an example, non-limiting computer-implemented method that can facilitate updating, such as averaging and/or training, of one or more statistical sets, in accordance with one or more embodiments described herein.
Figure 7B:
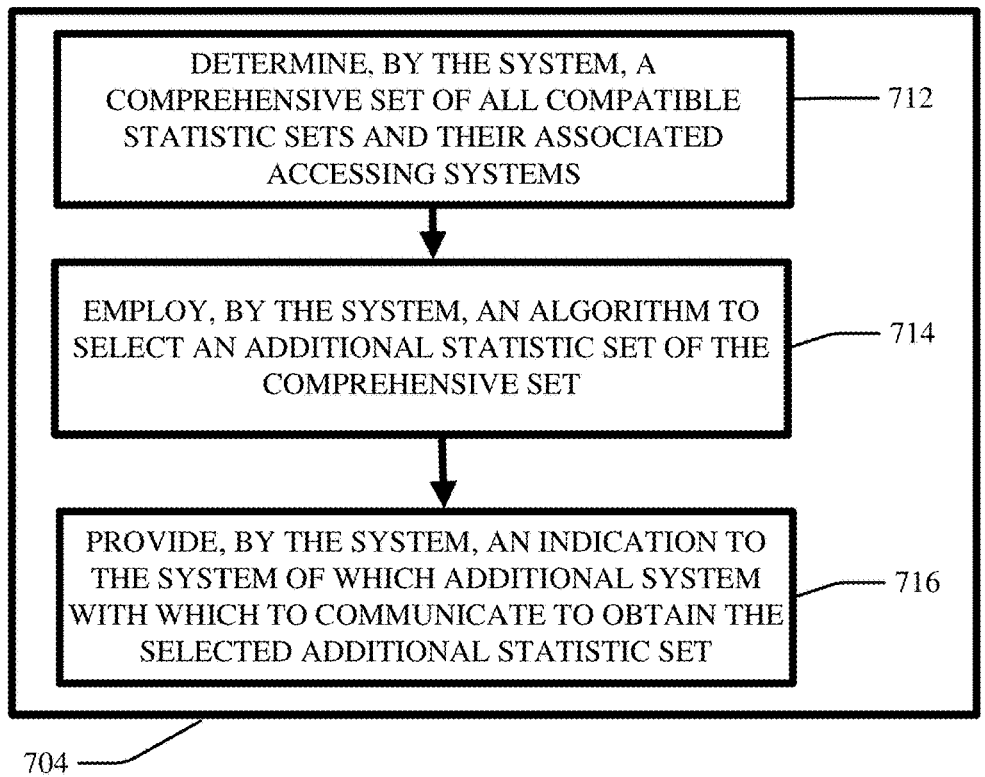
FIG. 7B illustrates a continuation of the flow diagram of FIG. 7A of an example, non-limiting computer-implemented method that can facilitate updating, such as averaging and/or training, of one or more statistical sets, in accordance with one or more embodiments described herein.

Referring next to FIGS. 7A and 7B, these figures together illustrate a flow diagram of an example, non-limiting computer-implemented method 700 that can facilitate the updating, such as training, of one or more statistical sets, in accordance with one or more embodiments described herein. Repetitive description of like elements and/or processes employed in respective embodiments is omitted for sake of brevity.

Looking first to 702 at FIG. 7A, the computer-implemented method 700 can comprise providing, by a system (e.g., via statistical set updating system 104A and/or providing component 120) operatively coupled to a processor (e.g., processor 118, a quantum processor and/or the like), of a statistical set (e.g. statistical set 110A).

At 704, the computer-implemented method 700 can comprise selecting, by the system (e.g., via statistical set updating system 104A and/or selecting component 122) at least one additional statistical set (e.g., additional statistical set 110B or 110C) of a plurality of additional statistical sets, according to a randomization pattern, such as via a respective algorithm (e.g., randomization algorithm 140).

At 705, the computer-implemented method 700 can comprise obtaining, by the system (e.g., via statistical set updating system 104A, computing component 124 and/or computation algorithm 142), the selected additional statistical set (e.g., additional statistical set 110B or 110C) from an additional system (e.g., additional system 104B or 104C) of a plurality of additional systems (e.g., including additional system 104B and 104C).

At 706, the computer-implemented method 700 can comprise computing, by the system (e.g., via statistical set updating system 104A, computing component 124 and/or computation algorithm 142), an output computation (e.g., an averaged statistical set 110A, such as replacing the non-averaged statistical set 110A) from the statistical set (e.g., non-averaged statistical set 110A) and the selected additional statistical set (e.g., non-averaged additional statistical set 110B or 110C).

At 708, the computer-implemented method 700 can comprise determining, by the system (e.g., via statistical set updating system 104A and/or monitoring component 126), if a consensus threshold has been reached among the now-averaged statistical set (e.g., statistical set 110A) and the plurality of additional statistical sets (e.g., additional statistical set 110B or 110C). If the consensus threshold has been reached, the method proceeds to block 710. If the consensus threshold has not been reached, the method proceeds backwards to repeat numerous blocks. The selecting block 704, obtaining block 705, computing block 706 and determining block 708 continue to repeat until the consensus threshold has been met. As described above, the consensus threshold can be a percentage of consensus among the statistical sets (e.g., statistical sets 110A and additional statistical sets 110B and 110C) that is not equal to a full 100% consensus. Additionally, upon additional iterations of the selecting block 704, obtaining block 705, computing block 706 and determining block 708, the now-averaged statistical set and the additional statistical sets can continue to be further updated, e.g., averaged, and thus can be referred to, respectively, as an averaged statistical set and as additional averaged statistical sets.

At 710, the computer-implemented method 700 can comprise providing, by the system (e.g., via statistical set updating system 104A and/or interfacing component 128) a final output statistical set after one or more iterations of averaging are completed.

Next, FIG. 7B illustrates a continuation of the method 700 partially illustrated at the flow diagram of FIG. 7A. At FIG. 7B, the selecting block 704 of the method 700 is broken down into internal sub-processes. Repetitive description of like elements and/or processes employed in respective embodiments is omitted for sake of brevity.

At 712, the computer-implemented method 700 can comprise determining, by the system (e.g., via statistical set updating system 104A and/or selecting component 122) a comprehensive set of all compatible statistical sets (e.g., including the statistical set 110A and the additional statistical sets 110B and 110C) and their associated accessing systems (e.g., including the statistical set updating system 104A and the additional systems 104B and 104C).

At 714, the computer-implemented method 700 can comprise employing, by the system (e.g., via statistical set updating system 104A and/or selecting component 122) an algorithm (e.g., randomization algorithm 140) to select an additional statistical set (e.g., additional statistical set 110B or 110C) of the comprehensive set (e.g., including the statistical set 110A and the additional statistical sets 110B and 110C).

At 716, the computer-implemented method 700 can comprise providing, by the system (e.g., via statistical set updating system 104A and/or selecting component 122) an indication to the system (e.g., via statistical set updating system 104A and/or computing component 124) of which additional system (e.g., additional system 104B or 104C) with which to communicate to obtain the selected additional statistical set (e.g., additional statistical set 110B or 110C).

In the above examples, it should be appreciated that the statistical set updating system 104A can eliminate human effort and reduce time involved with updating, such as averaging and/or training, a plurality of statistical sets. In this example, statistical set updating system 104A can automatically provide the updating without user involvement in the respective operations performed.

In the examples above, it also should be appreciated that statistical set updating system 104A can enable scaled updating of more than one set of statistical sets. For example, in the software technical support domain, statistical set updating system 104A can enable scaling technician skills, as technicians in this domain can employ statistical set updating system 104A to update statistical sets, such as to train numerous different ML models.

As will be appreciated, the statistical set updating system 104A provides a new approach driven by previously unincorporated randomization of distributed updating. For example, statistical set updating system 104A can provide a new approach to more quickly and automatically update one or more statistical sets without constituent feedback. In an example, statistical set updating system 104A can provide a new approach to scale updating of two or more sets of statistical sets concurrently. In an example, statistical set updating system 104A can provide a new approach for selective control of the statistical set updating system 104A with respect to the randomization pattern employed, such as allowing for specialization relative to a respective system of nodes. In an example, statistical set updating system 104A can provide a new approach for: more quickly freeing up processing power and/or memory at the statistical set updating systems involved; increasing a convergence rate to consensus of the statistical sets being updated decreasing communication cost among the statistical set updating systems involved; utilizing fewer iterations of updating; and/or more quickly freeing up processing power and/or memory at the statistical set updating systems involved, as regards systems not employing a statistical set updating system as described herein.

Statistical set updating system 104A can provide technical improvements to a processing unit associated with statistical set updating system 104A. For example, in performing the above-described randomized distributed updating of a plurality of statistical sets, statistical set updating system 104A can increase the speed of computation and/or lower the communication cost associated with updating of a plurality of statistical sets by a respective system. Accordingly, by this example, the statistical set updating system 104A can thereby facilitate improved performance, improved efficiency and/or reduced computational cost associated with a processing unit (e.g., processor 118) employing the statistical set updating system 104A. Additionally, in view of the randomized statistical set updating employed by the statistical set updating system 104A, noise can be reduced enabling the statistical set updating system 104A to find a more robust local optimum in a respective optimization landscape, as compared to available updating methods, such as those utilizing fixed statistical set updating. That is, the statistical set updating system 104A can have better generalization, therefore reducing a degree of overfitting.

A practical application of the statistical set updating system 104A is that it can be implemented in one or more domains to enable scaled updating of more than one set of statistical sets. For example, a practical application of statistical set updating system 104A is that it can be implemented in the software technical support domain, such that a technician therein can employ statistical set updating system 104A to simultaneously update two or more sets of statistical sets.

Statistical set updating system 104A can employ hardware and/or software to solve problems that are highly technical in nature (e.g., related to automated updating of statistical sets, such as averaging of statistical sets or such as training of ML models), that are not abstract, and that cannot be performed as a set of mental acts by a human. For example, a human, or even thousands of humans, cannot efficiently, accurately and/or effectively manually update statistical sets, such as average statistical sets or train ML models.

In some embodiments, one or more of the processes described herein can be performed by one or more specialized computers (e.g., a specialized processing unit, a specialized classical computer, a specialized quantum computer and/or another type of specialized computer) to execute defined tasks related to the various technologies identified above. Statistical set updating system 104A and/or components thereof, can be employed to solve new problems that arise through advancements in technologies mentioned above, employment of quantum computing systems, cloud computing systems, computer architecture and/or another technology.

It is to be appreciated that statistical set updating system 104A can utilize various combinations of electrical components, mechanical components and/or circuitry that cannot be replicated in the mind of a human and/or performed by a human, as the various operations that can be executed by statistical set updating system 104A and/or components thereof as described herein are operations that are greater than the capability of a human mind. For instance, the amount of statistics processed, the speed of processing the statistics and/or the types of statistics processed by statistical set updating system 104A over a certain period of time can be greater, faster and/or different than the amount, speed and/or statistics type that can be processed and/or comprehended by a human mind over the same period of time.

According to several embodiments, statistical set updating system 104A also can be fully operational towards performing one or more other functions (e.g., fully powered on, fully executed and/or another function) while also performing the various operations described herein. It should be appreciated that the simultaneous multi-operational execution is beyond the capability of a human mind. It should also be appreciated that statistical set updating system 104A can include information that is impossible to obtain manually by an entity, such as a human user. For example, the type, amount and/or variety of information included in and/or employed by statistical set updating system 104A, selecting component 122, computing component 124 and/or monitoring component 126 can be more complex than information obtained manually by an entity, such as a human user.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

In order to provide additional context for various embodiments described herein, FIG. 8 and the following discussion are intended to provide a brief, general description of a suitable operating environment 800 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures and/or the like that perform particular tasks and/or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, handheld computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located both in local and remote memory storage devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, disk storage and/or other magnetic storage devices, solid state drives and/or other solid state storage devices, and/or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, but not limitation, communication media can include wired media, such as a wired network and/or direct-wired connection, and/or wireless media such as acoustic, RF, infrared and/or other wireless media.

With reference again to FIG. 8, the example operating environment 800 for implementing various embodiments of the aspects described herein includes a computer 802, the computer 802 including a processing unit 804, a system memory 806 and/or a system bus 808. The system bus 808 can couple system components including, but not limited to, the system memory 806 to the processing unit 804. The processing unit 804 can be any of various commercially available processors. Dual microprocessors and/or other multi-processor architectures can be employed as the processing unit 804.

The system bus 808 can be any of several types of bus structure that can further interconnect to a memory bus (with or without a memory controller), a peripheral bus and/or a local bus using any of a variety of commercially available bus architectures. The system memory 806 can include ROM 810 and/or RAM 812. A basic input/output system (BIOS) can be stored in a non-volatile memory such as ROM, erasable programmable read only memory (EPROM) and/or EEPROM, which BIOS contains the basic routines that help to transfer information among elements within the computer 802, such as during startup. The RAM 812 can also include a high-speed RAM, such as static RAM for caching data.

The computer 802 further can include an internal hard disk drive (HDD) 814 (e.g., EIDE, SATA), one or more external storage devices 816 (e.g., a magnetic floppy disk drive (FDD), a memory stick or flash drive reader, a memory card reader and/or the like) and/or a drive 820, e.g., such as a solid state drive or an optical disk drive, which can read or write from a disk 822, such as a CD-ROM disc, a DVD, a BD and/or the like. Alternatively, where a solid state drive is involved, disk 822 could not be included, unless separate. While the internal HDD 814 is illustrated as located within the computer 802, the internal HDD 814 can also be configured for external use in a suitable chassis (not shown). Additionally, while not shown in operating environment 800, a solid state drive (SSD) could be used in addition to, or in place of, an HDD 814. The HDD 814, external storage device(s) 816 and drive 820 can be connected to the system bus 808 by an HDD interface 824, an external storage interface 826 and a drive interface 828, respectively. The HDD interface 824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 812, including an operating system 830, one or more applications 832, other program modules 834 and/or program data 836. All or portions of the operating system, applications, modules and/or data can also be cached in the RAM 812. The systems and methods described herein can be implemented utilizing various commercially available operating systems and/or combinations of operating systems.

Computer 802 can optionally comprise emulation technologies. For example, a hypervisor (not shown) or other intermediary can emulate a hardware environment for operating system 830, and the emulated hardware can optionally be different from the hardware illustrated in FIG. 8. In a related embodiment, operating system 830 can comprise one virtual machine (VM) of multiple VMs hosted at computer 802. Furthermore, operating system 830 can provide runtime environments, such as the JAVA runtime environment or the .NET framework, for applications 832. Runtime environments are consistent execution environments that allow applications 832 to run on any operating system that includes the runtime environment. Similarly, operating system 830 can support containers, and applications 832 can be in the form of containers, which are lightweight, standalone, executable packages of software that include, e.g., code, runtime, system tools, system libraries and/or settings for an application.

Further, computer 802 can be enabled with a security module, such as a trusted processing module (TPM). For instance, with a TPM, boot components hash next in time boot components and wait for a match of results to secured values before loading a next boot component. This process can take place at any layer in the code execution stack of computer 802, e.g., applied at application execution level and/or at operating system (OS) kernel level, thereby enabling security at any level of code execution.

A user entity can enter commands and information into the computer 802 through one or more wired/wireless input devices, e.g., a keyboard 838, a touch screen 840 and/or a pointing device, such as a mouse 842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices can be connected to the processing unit 804 through an input device interface 844 that can be coupled to the system bus 808, but can be connected by other interfaces, such as a parallel port, an IEEE 1394 serial port, a game port, a USB port, an IR interface, a BLUETOOTH® interface and/or the like.

A monitor 846 or other type of display device can be also connected to the system bus 808 via an interface, such as a video adapter 848. In addition, a computer typically includes other peripheral output devices (not shown), such as speakers, printers and/or the like.

The computer 802 can operate in a networked environment using logical connections via wired and/or wireless communications to one or more remote computers, such as a remote computer(s) 850. The remote computer(s) 850 can be a workstation, a server computer, a router, a personal computer, portable computer, microprocessor-based entertainment appliance, a peer device and/or other common network node, and typically includes many or all of the elements described relative to the computer 802, although, for purposes of brevity, only a memory/storage device 852 is illustrated. The logical connections depicted include wired/wireless connectivity to a local area network (LAN) 854 and/or larger networks, e.g., a wide area network (WAN) 856. LAN and WAN networking environments are commonplace in offices and companies, and facilitate enterprise-wide computer networks, such as intranets, all of which can connect to a global communications network, e.g., the Internet.

When used in a LAN networking environment, the computer 802 can be connected to the local network 854 through a wired and/or wireless communication network interface or adapter 858. The adapter 858 can facilitate wired or wireless communication to the LAN 854, which can also include a wireless access point (AP) disposed thereon for communicating with the adapter 858 in a wireless mode.

When used in a WAN networking environment, the computer 802 can include a modem 860 and/or can be connected to a communications server on the WAN 856 via other means for establishing communications over the WAN 856, such as by way of the Internet. The modem 860, which can be internal or external and a wired and/or wireless device, can be connected to the system bus 808 via the input device interface 844. In a networked environment, program modules depicted relative to the computer 802 or portions thereof, can be stored in the remote memory/storage device 852. It will be appreciated that the network connections shown are example and other means of establishing a communications link among the computers can be used.

When used in either a LAN or WAN networking environment, the computer 802 can access cloud storage systems or other network-based storage systems in addition to, or in place of, external storage devices 816 as described above, such as but not limited to, a network virtual machine providing one or more aspects of storage or processing of information. Generally, a connection between the computer 802 and a cloud storage system can be established over a LAN 854 or WAN 856 e.g., by the adapter 858 or modem 860, respectively. Upon connecting the computer 802 to an associated cloud storage system, the external storage interface 826 can, with the aid of the adapter 858 and/or modem 860, manage storage provided by the cloud storage system as it would other types of external storage. For instance, the external storage interface 826 can be configured to provide access to cloud storage sources as if those sources were physically connected to the computer 802.

The computer 802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf and/or the like), and/or telephone. This can include Wireless Fidelity (Wi-Fi) and BLUETOOTH® wireless technologies. Thus, the communication can be a predefined structure as with a conventional network or simply an ad hoc communication between at least two devices.

Figure 9:
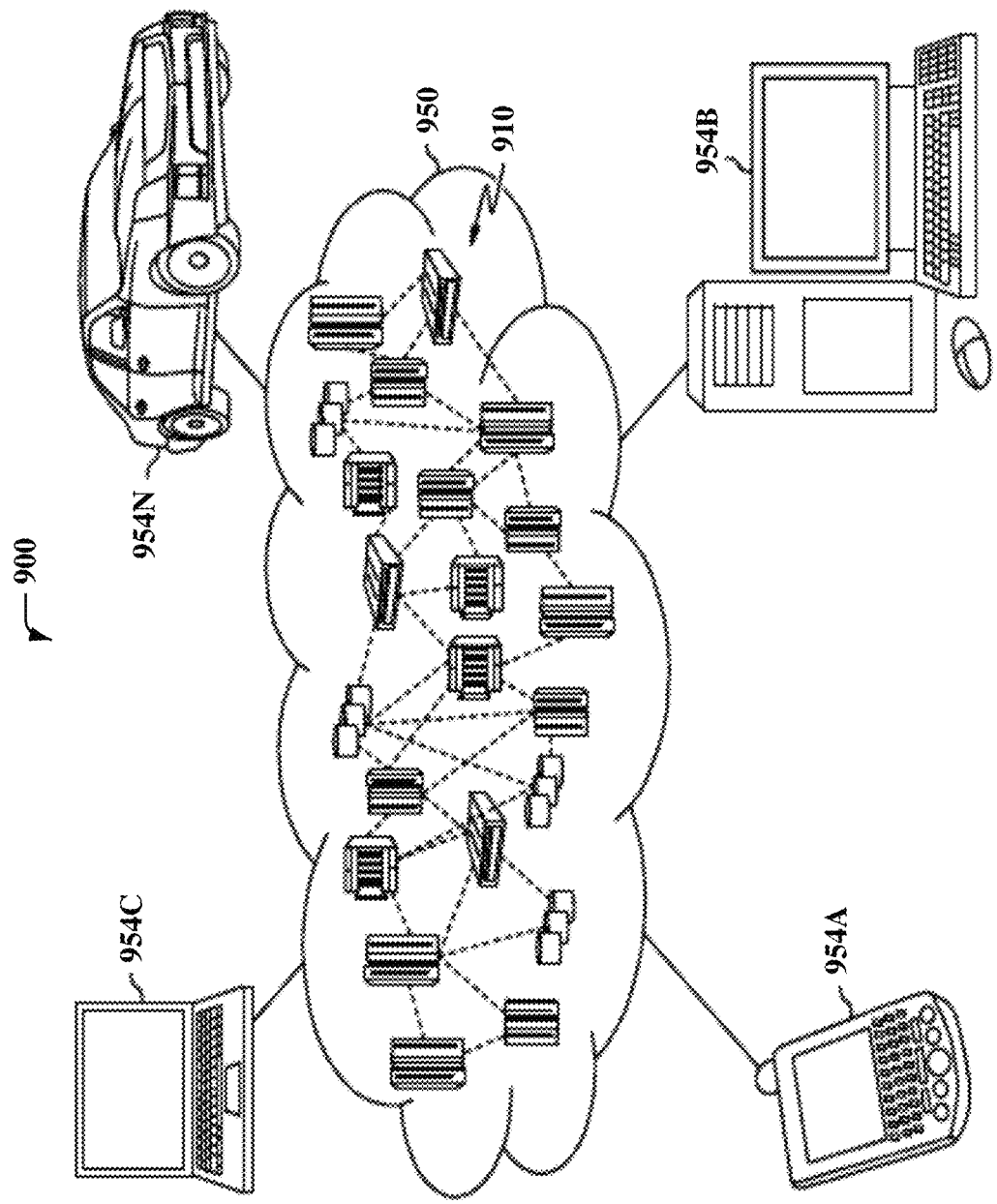
FIG. 9 illustrates a block diagram of an example, non-limiting cloud computing environment in accordance with one or more embodiments described herein.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C and/or automobile computer system 954N can communicate. Although not illustrated in FIG. 9, cloud computing nodes 910 can further comprise a quantum platform (e.g., quantum computer, quantum hardware, quantum software and/or the like) with which local computing devices used by cloud consumers can communicate. Cloud computing nodes 910 can communicate with one another. They can be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that cloud computing nodes 910 and cloud computing environment 950 can communicate with any type of computerized device over any type of network and/or network addressable connection (e.g., using a web browser).

Figure 10:
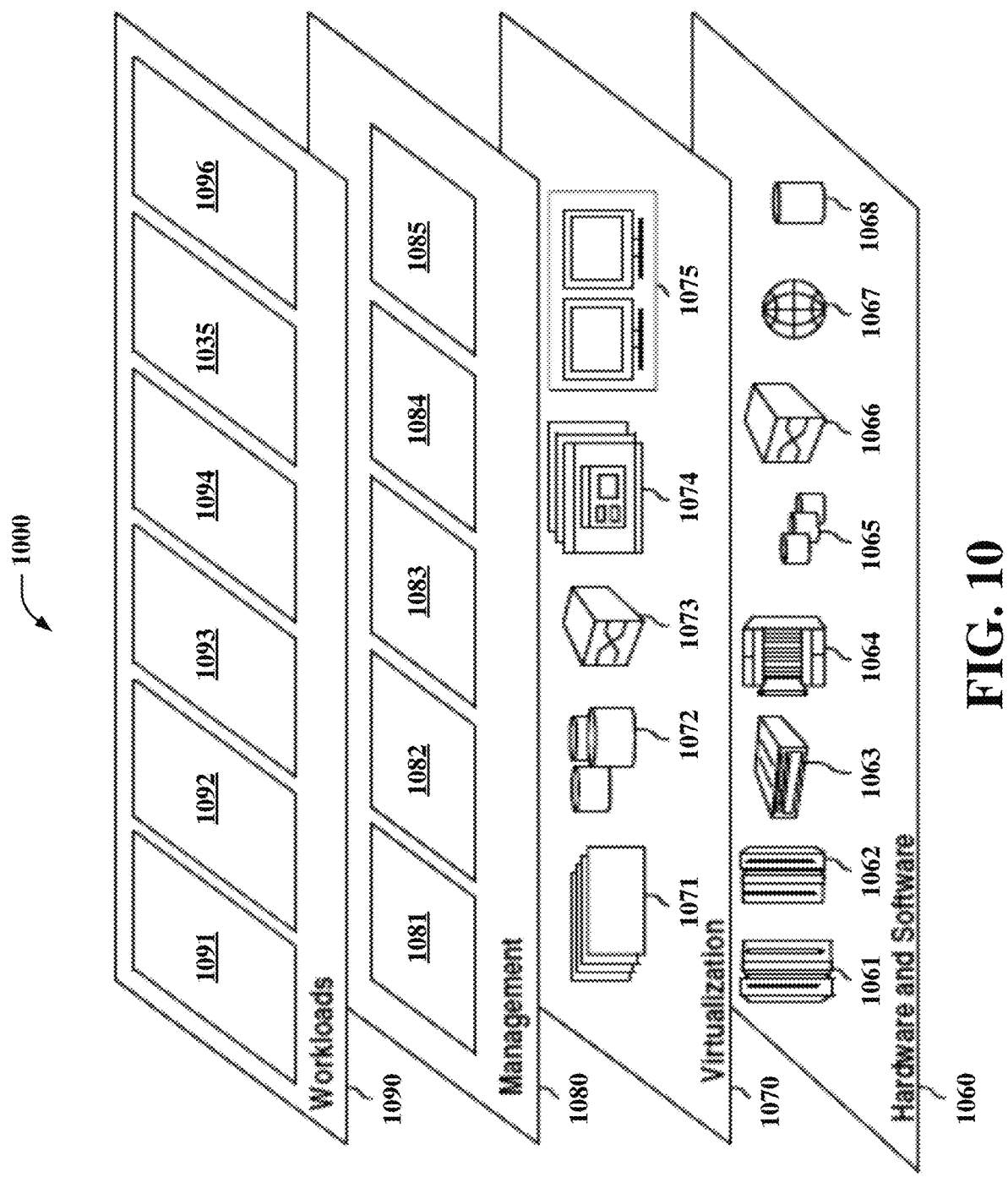
FIG. 10 illustrates a block diagram of a plurality of example, non-limiting abstraction model layers, in accordance with one or more embodiments described herein.

Referring now to FIG. 10, a set of functional abstraction layers is shown, such as provided by cloud computing environment 950 (FIG. 9). It should be understood in advance that the components, layers and functions shown in FIG. 10 are intended to be illustrative only and embodiments described herein are not limited thereto. As depicted, the following layers and corresponding functions are provided:

Hardware and software layer 1060 can include hardware and software components. Examples of hardware components include: mainframes 1061; RISC (Reduced Instruction Set Computer) architecture-based servers 1062; servers 1063; blade servers 1064; storage devices 1065; and networks and networking components 1066. In some embodiments, software components can include network application server software 1067, quantum platform routing software 1068 and/or quantum software (not illustrated in FIG. 10).

Virtualization layer 1070 can provide an abstraction layer from which the following examples of virtual entities can be provided: virtual servers 1071; virtual storage 1072; virtual networks 1073, including virtual private networks; virtual applications and/or operating systems 1074; and/or virtual clients 1075.

In one example, management layer 1080 can provide the functions described below. Resource provisioning 1081 can provide dynamic procurement of computing resources and other resources that can be utilized to perform tasks within the cloud computing environment. Metering and Pricing 1082 can provide cost tracking as resources are utilized within the cloud computing environment, and billing or invoicing for consumption of these resources. In one example, these resources can include application software licenses. Security can provide identity verification for cloud consumers and tasks, as well as protection for data and other resources. User (or constituent) portal 1083 can provide access to the cloud computing environment for consumers and system administrators. Service level management 1084 can provide cloud computing resource allocation and management such that required service levels are met. Service Level Agreement (SLA) planning and fulfillment 1085 can provide pre-arrangement for, and procurement of, cloud computing resources for which a future requirement is anticipated in accordance with an SLA.

Workloads layer 1090 can provide examples of functionality for which the cloud computing environment can be utilized. Non-limiting examples of workloads and functions which can be provided from this layer include: mapping and navigation 1091; software development and lifecycle management 1092; virtual classroom education delivery 1093; data analytics processing 1094; transaction processing 1095; and/or application transformation software 1096.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and/or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry or either source code or object code written in any combination of one or more programming languages, including an object oriented programming language such as Smalltalk, C++, or the like, and/or procedural programming languages, such as the "C" programming language or similar programming languages. The computer readable program instructions can execute entirely on the user's computer, partly on the user's computer, as a stand-alone software package, partly on the user's computer and/or partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described herein with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, and/or other device to cause a series of operational acts to be performed on the computer, other programmable apparatus or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality, and operation of possible implementations of systems, computer-implementable methods and/or computer program products according to various embodiments described herein. In this regard, each block in the flowchart or block diagrams can represent a module, segment and/or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions and/or acts or carry out combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with other program modules. Generally, program modules include routines, programs, components, data structures and/or the like that perform particular tasks and/or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics, and/or the like. The illustrated aspects can also be practiced in distributed computing environments in which tasks are performed by remote processing devices that are linked through a communications network. However, some, if not all aspects of the one or more embodiments can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the disclosed memory components of systems and/or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing the one or more embodiments, but one of ordinary skill in the art can recognize that many further combinations and permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
      a statistic set updating component that updates a statistical set employed for training a machine learning node of a group of machine learning nodes distributed on a network, comprising iteratively performing until a convergence criterion is satisfied:
         select, using a randomization pattern, an additional statistical set from respective statistical sets employed for training the group of machine learning nodes, wherein the additional statistical set is other than the statistical set; and
         update the statistical set associated with the machine learning node by averaging the statistical set with the additional statistical set.

2. The system of claim 1, wherein the statistic set updating component, after a defined number of iterations, changes the randomization pattern.

3. The system of claim 2, wherein the change in the randomization pattern comprises a change in an order of communication among the group of machine learning nodes.

4. The system of claim 2, wherein the change in the randomization pattern comprises a change in a communication topology among the group of machine learning nodes.

5. The system of claim 2, wherein the defined number of iterations is randomly selected.

6. The system of claim 1, wherein the statistic set updating component, in response to the statistical set meeting a defined convergence rate with the respective statistical sets associated with the group of machine learning nodes, changes the randomization pattern.

7. The system of claim 1, wherein at least one statistical set of the respective statistical sets, other than the statistical set, is concurrently updated with the statistical set.

8. A computer-implemented method, comprising:
updating, by a system operatively coupled to a processor, a statistical set employed for training a machine learning node of a group of machine learning nodes distributed on a network, comprising iteratively performing until a convergence criterion is satisfied:
selecting, by the system, using a randomization pattern, an additional statistical set from respective statistical sets employed for training the group of machine learning nodes, wherein the additional statistical set is other than the statistical set; and
updating, by the system, the statistical set associated with the machine learning node by averaging the statistical set with the additional statistical set.

9. The computer-implemented method of claim 8, further comprising:
changing, by the system, after a defined number of iterations, the randomization pattern.

10. The computer-implemented method of claim 9, wherein the change in the randomization pattern comprises a change in an order of communication among the group of machine learning nodes.

11. The computer-implemented method of claim 9, wherein the change in the randomization pattern comprises a change in a communication topology among the group of machine learning nodes.

12. The computer-implemented method of claim 9, wherein the defined number of iterations is randomly selected.

13. The computer-implemented method of claim 8, further comprising:
in response to the statistical set meeting a defined convergence rate with the respective statistical sets associated with the group of machine learning nodes, changing, by the system, the randomization pattern.

14. The computer-implemented method of claim 8, wherein at least one statistical set of the respective statistical sets, other than the statistical set, is concurrently updated with the statistical set.

15. A computer program product facilitating a process to compute update a statistical set, the computer program product comprising a computer readable storage medium having program instructions embodied therewith, the program instructions executable by a processor to cause the processor to:
update, by the processor, the statistical set employed for training a machine learning node of a group of machine learning nodes distributed on a network, comprising iteratively performing until a convergence criterion is satisfied:
select, by the processor, using a randomization pattern, an additional statistical set from respective statistical sets employed for training the group of machine learning nodes, wherein the additional statistical set is other than the statistical set; and
update, by the processor, the statistical set associated with the machine learning node by averaging the statistical set with the additional statistical set.

16. The computer program product of claim 15, wherein the program instructions further are executable by the processor to cause the processor to:
change, by the processor, after a defined number of iterations, the randomization pattern.

17. The computer program product of claim 16, wherein the change in the randomization pattern comprises a change in an order of communication among the group of machine learning nodes.

18. The computer program product of claim 16, wherein the change in the randomization pattern comprises a change in a communication topology among the group of machine learning nodes.

19. The computer program product of claim 16, wherein the defined number of iterations is randomly selected.

20. The computer program product of claim 15, wherein the program instructions further are executable by the processor to cause the processor to:
in response to the statistical set meeting a defined convergence rate with the respective statistical sets associated with the group of machine learning nodes, change, by the processor, the randomization pattern.

* * * * *